(12) United States Patent
Tada et al.

(10) Patent No.: US 9,434,622 B2
(45) Date of Patent: Sep. 6, 2016

(54) SINTERED FERRITE MATERIAL, WIRE WOUND COMPONENT, AND PRODUCING METHOD OF SINTERED FERRITE MATERIAL

(75) Inventors: Tomoyuki Tada, Osaka (JP); Yasuharu Miyoshi, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 1259 days.

(21) Appl. No.: 12/867,693

(22) PCT Filed: Feb. 13, 2009

(86) PCT No.: PCT/JP2009/052365
§ 371 (c)(1),
(2), (4) Date: Oct. 8, 2010

(87) PCT Pub. No.: WO2009/101999
PCT Pub. Date: Aug. 20, 2009

(65) Prior Publication Data
US 2011/0018675 A1      Jan. 27, 2011

(30) Foreign Application Priority Data

Feb. 14, 2008  (JP) .................................. 2008-032501
Jan. 20, 2009  (JP) .................................. 2009-009517

(51) Int. Cl.
| | | |
|---|---|---|
| H01F 1/34 | (2006.01) | |
| C04B 35/26 | (2006.01) | |
| C01G 49/00 | (2006.01) | |
| C04B 35/626 | (2006.01) | |
| H01F 1/36 | (2006.01) | |
| H01F 41/02 | (2006.01) | |

(52) U.S. Cl.
CPC ............. C01G 49/009 (2013.01); C04B 35/26 (2013.01); C04B 35/2616 (2013.01); C04B 35/6262 (2013.01); C04B 35/62675 (2013.01); C04B 35/62685 (2013.01); H01F 1/36 (2013.01); H01F 41/0246 (2013.01); *C01P 2004/03* (2013.01); *C01P 2004/61* (2013.01); *C01P 2006/40* (2013.01); *C01P 2006/42* (2013.01); *C04B 2235/3203* (2013.01); *C04B 2235/3262* (2013.01); *C04B 2235/3281* (2013.01); *C04B 2235/3284* (2013.01); *C04B 2235/3298* (2013.01); *C04B 2235/6585* (2013.01); *C04B 2235/786* (2013.01); *H01F 1/344* (2013.01)

(58) Field of Classification Search
CPC ........................... G01F 1/344; C04B 35/2691
USPC .................. 252/62.62, 62.55, 62.56
See application file for complete search history.

(56) References Cited

U.S. PATENT DOCUMENTS

| | | | | |
|---|---|---|---|---|
| 2,709,248 | A * | 5/1955 | Rosenberg | ............... 365/230.07 |
| 3,609,084 | A * | 9/1971 | Loye | ................... C04B 35/2616 |
| | | | | 252/62.59 |
| 3,630,912 | A * | 12/1971 | Argentina et al. | ... C04B 35/2691 |
| | | | | 252/62.59 |
| 3,640,867 | A * | 2/1972 | Iimura et al. | ............... 252/62.61 |
| 7,892,446 | B2 * | 2/2011 | Miyoshi | .............. C04B 35/2616 |
| | | | | 252/62.2 |
| 2009/0050840 | A1 | 2/2009 | Miyoshi et al. | |

FOREIGN PATENT DOCUMENTS

| | | |
|---|---|---|
| EP | 1 925 603 A1 | 5/2008 |
| JO | 2006-282440 | 10/2006 |
| JP | S55-27015 | 7/1980 |
| JP | 60-076106 A | 4/1985 |
| JP | 2004-153197 | 5/2004 |
| JP | 2006-282440 | * 10/2006 |
| JP | 2006-344683 A | 12/2006 |
| JP | 2007-76964 A | 3/2007 |
| JP | 2007-290883 A | 11/2007 |
| WO | WO 2007/032338 A1 | 3/2007 |

OTHER PUBLICATIONS

Liu. Effects of sintering temperature and Bi2O3 content on microstructure and magnetic properties of LiZn ferrites. Journal of Magnetism and Magnetic Materials 320 Oct. 26, 2007 1335-1339.*
Soshi Chikazumi et al., *Jiseitai Handbook*, $2^{nd}$ print, Asakura Publishing Co., Ltd., 1978, pp. 621, 622.
Yuzo Shichijo et al., *Ferrite*, $2^{nd}$ print, The Nikkan Kogyo Shinbun, Ltd., 1960, pp. 53, 54.
Japanese Office Action dated Jan. 18, 2013 for corresponding Japanese Application No. 2009-009517 with partial English translation.
Liu et al., "Effects of sintering temparture and $Bi_2O_3$ content magnetic properties of LiZn ferrites," Science Direct, J. of Magnetism and Magnetic Materials, vol. 320. pp. 1335-1339 (Oct. 26, 2007).
Chikakado et al. Jiseitai handbook (handbook for magnetic body), Japan, Jul. 20, 1978, $1^{st}$ edition ($2^{nd}$ issue), p. 1098.

* cited by examiner

*Primary Examiner* — Matthew E Hoban
(74) *Attorney, Agent, or Firm* — Muncy, Geissler, Olds & Lowe, P.C.

(57) ABSTRACT

A sintered ferrite material, which is obtained by adding $Bi_2O_3$ in a range from 0.5% by mass to 3% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 \leq z \leq 0.03$ and satisfies resistivity equal to or higher than $10^6$ Ωm, initial permeability equal to or higher than 200 and saturation magnetic flux density equal to or higher than 430 mT at 23° C. and equal to or higher than 380 mT at 100° C.

13 Claims, 35 Drawing Sheets

FIG. 1

| SAMPLE NUMBER | COMPOSITION OF MAIN COMPONENT (mol%) | | | ACCESSORY COMPONENT (mass %) Bi$_2$O$_3$ | $\mu i$ | Bs (mT) (23°C) | Bs (mT) (100°C) | $\rho$ ($\Omega$m) | $\mu i$ RATE OF CHANGE (%) |
|---|---|---|---|---|---|---|---|---|---|
| | (Li$_{0.5}$Fe$_{0.5}$)O | ZnO | Fe$_2$O$_3$** | | | | | | |
| 1* | 38.3 | 12.5 | 49.2 | 0.75 | 174 | 436 | 411 | 2.4E+07 | 1.8 |
| 2 | 35.8 | 15.0 | 49.2 | 0.75 | 216 | 444 | 410 | 1.3E+07 | 1.7 |
| 3 | 35.0 | 15.8 | 49.2 | 0.75 | 237 | 446 | 407 | 2.5E+07 | 2.1 |
| 4 | 33.9 | 16.9 | 49.2 | 0.75 | 251 | 449 | 405 | 2.3E+07 | 2.3 |
| 5 | 33.3 | 17.5 | 49.2 | 0.75 | 267 | 446 | 399 | 1.7E+07 | 2.3 |
| 6 | 32.1 | 18.8 | 49.2 | 0.75 | 292 | 435 | 386 | 1.6E+07 | 4.5 |
| 7* | 30.5 | 20.3 | 49.2 | 0.75 | 311 | 421 | 369 | 1.9E+07 | 5.4 |

**: THE AMOUNT OF Fe$_2$O$_3$ INCLUDED IN (Li$_{0.5}$Fe$_{0.5}$)O IS EXCLUDED.

F I G. 3
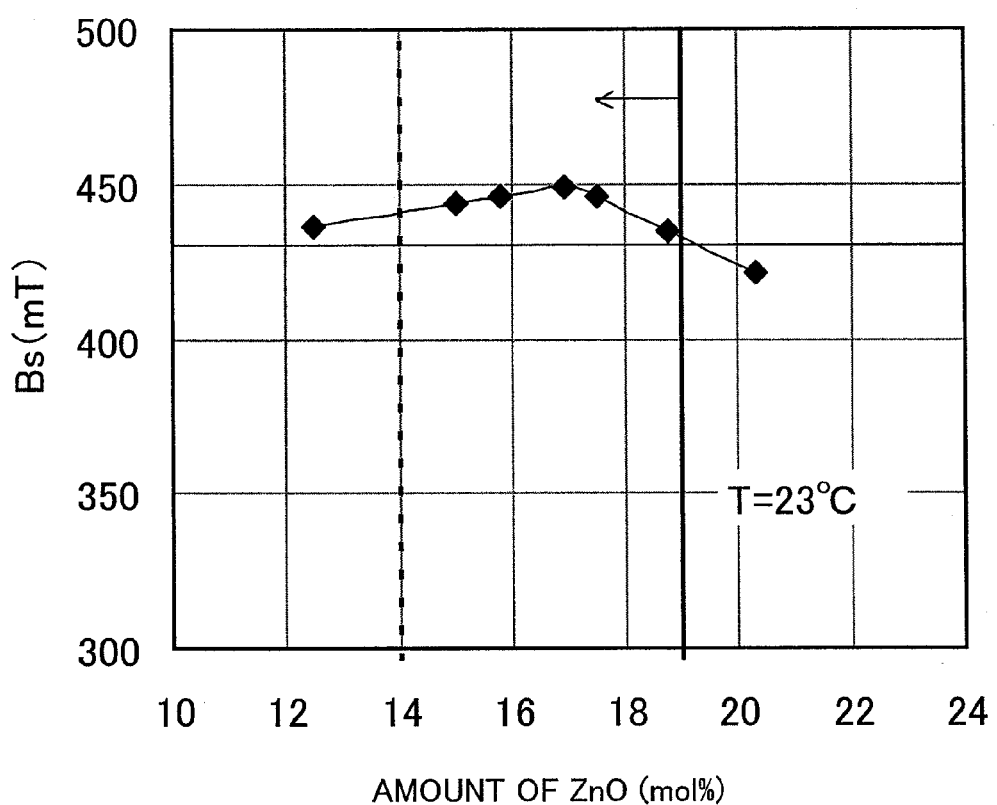

FIG. 6

| SAMPLE NUMBER | COMPOSITION OF MAIN COMPONENT (mol%) | | | ACCESSORY COMPONENT (mass %) | $\mu i$ | Bs (mT) (23°C) | Bs (mT) (100°C) | $\rho$ ($\Omega$m) | $\mu i$ RATE OF CHANGE (%) |
|---|---|---|---|---|---|---|---|---|---|
| | $(Li_{0.5}Fe_{0.5})O$ | ZnO | $Fe_2O_3$** | $Bi_2O_3$ | | | | | |
| 8* | 35.9 | 16.9 | 47.2 | 0.75 | 210 | 424 | 362 | 2.4E+07 | 1.4 |
| 9 | 35.1 | 16.9 | 48.0 | 0.75 | 236 | 432 | 383 | 4.2E+07 | 1.5 |
| 10 | 34.5 | 16.9 | 48.6 | 0.75 | 242 | 443 | 397 | 3.8E+07 | 2 |
| 11 | 33.9 | 16.9 | 49.2 | 0.75 | 251 | 449 | 405 | 2.3E+07 | 2.3 |
| 12 | 33.3 | 16.9 | 49.8 | 0.75 | 267 | 452 | 408 | 2.2E+07 | 2.7 |
| 13* | 32.6 | 16.9 | 50.5 | 0.75 | 254 | 451 | 407 | 7.5E+05 | 3.8 |
| 14* | 31.1 | 16.9 | 52.0 | 0.75 | 238 | 451 | 403 | 3.1E+01 | 6.1 |

**: THE AMOUNT OF $Fe_2O_3$ INCLUDED IN $(Li_{0.5}Fe_{0.5})O$ IS EXCLUDED.

FIG. 11

| SAMPLE NUMBER | COMPOSITION OF MAIN COMPONENT (mol%) | | | | ACCESSORY COMPONENT (mass%) | $\mu i$ | Bs (mT) (23°C) | Bs (mT) (100°C) | $\rho$ ($\Omega$m) | $\mu i$ RATE OF CHANGE (%) |
|---|---|---|---|---|---|---|---|---|---|---|
| | $(Li_{0.5}Fe_{0.5})O$ | CuO | ZnO | $Fe_2O_3$** | $Bi_2O_3$ | | | | | |
| 15 | 33.9 | 0.0 | 16.9 | 49.2 | 0.75 | 251 | 449 | 405 | 2.3E+07 | 2.3 |
| 16 | 33.4 | 0.5 | 16.9 | 49.2 | 0.75 | 239 | 446 | 400 | 5.4E+07 | 2.4 |
| 17 | 32.9 | 1.0 | 16.9 | 49.2 | 0.75 | 235 | 446 | 398 | 1.2E+08 | 2.8 |
| 18 | 31.9 | 2.0 | 16.9 | 49.2 | 0.75 | 227 | 444 | 392 | 1.4E+08 | 2.9 |
| 19* | 29.9 | 4.0 | 16.9 | 49.2 | 0.75 | 188 | 432 | 375 | 2.6E+08 | 3.8 |

**: THE AMOUNT OF $Fe_2O_3$ INCLUDED IN $(Li_{0.5}Fe_{0.5})O$ IS EXCLUDED.

F I G. 1 2
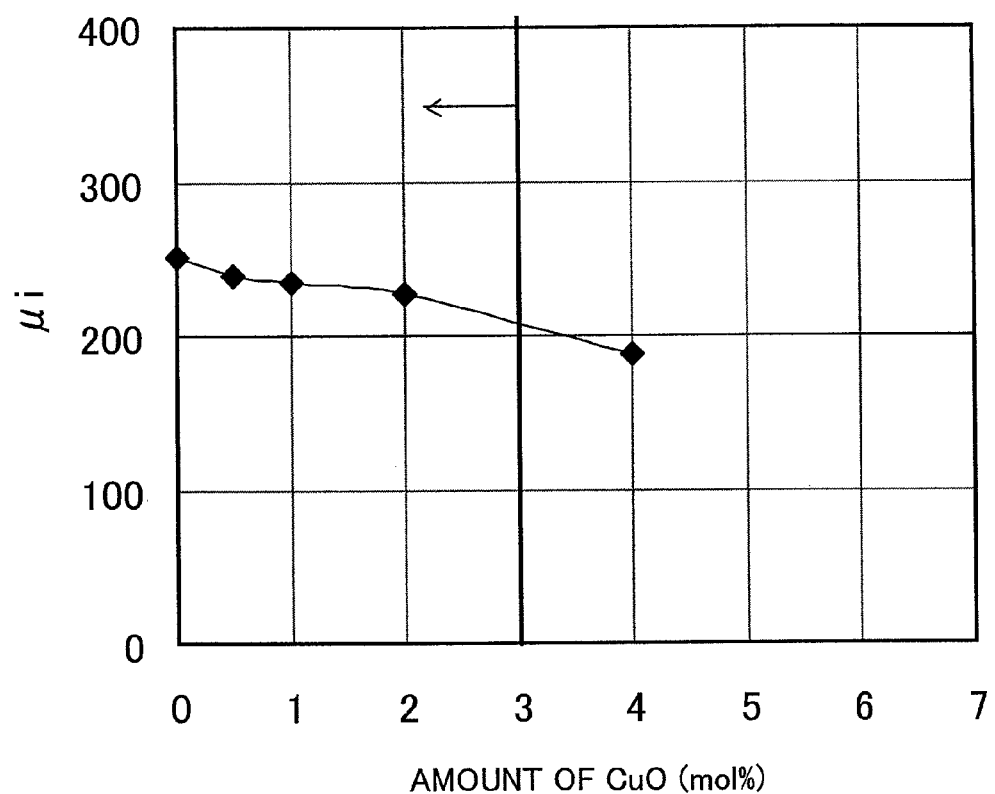

F I G. 1 4
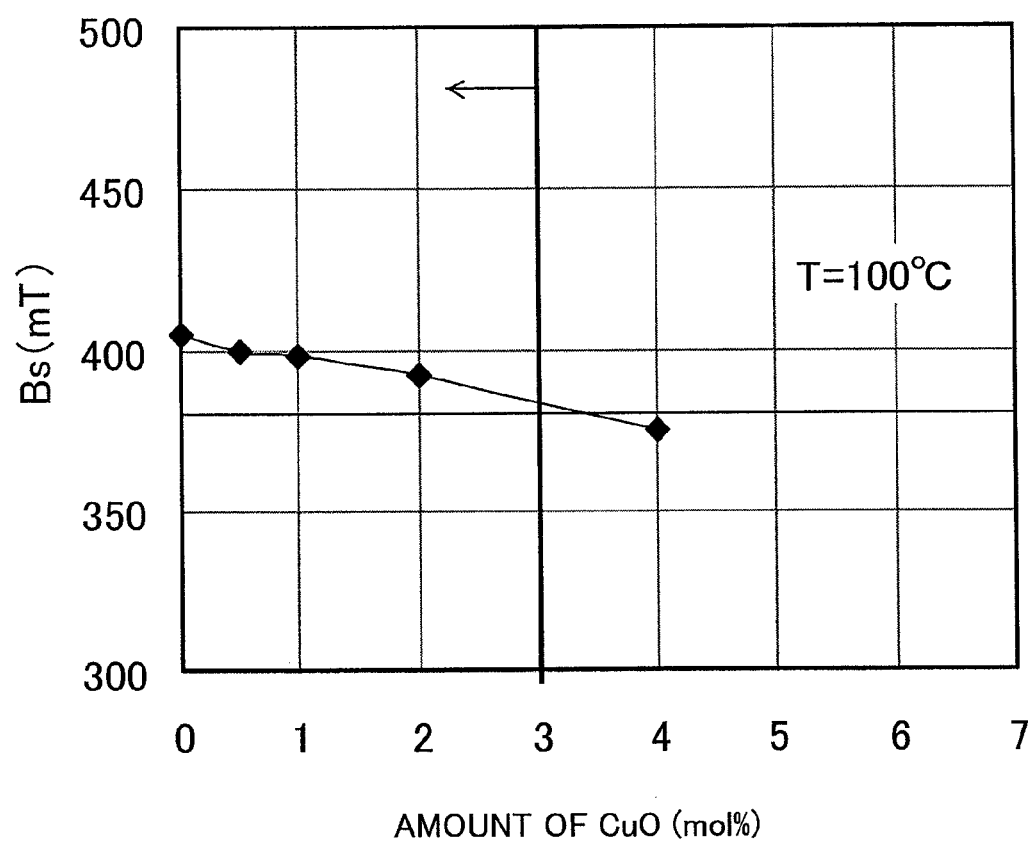

F I G. 1 5
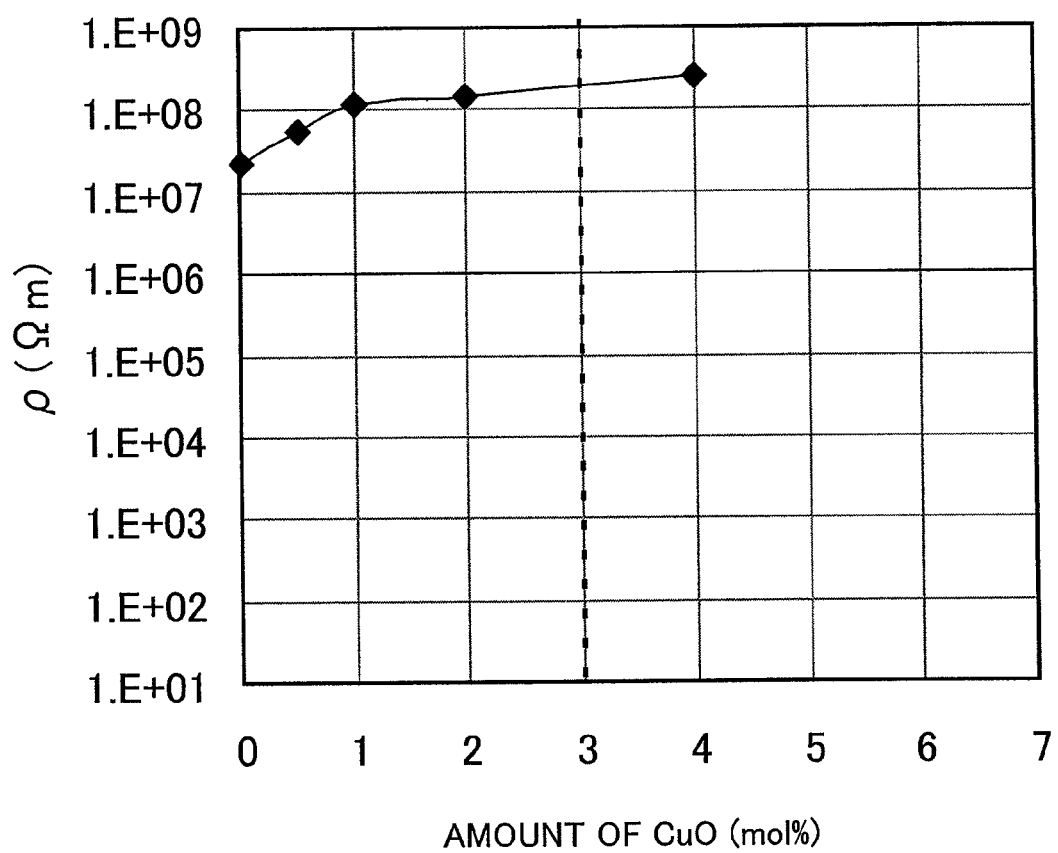

F I G. 1 6

| SAMPLE NUMBER | COMPOSITION OF MAIN COMPONENT (mol%) | | | ACCESSORY COMPONENT (mass %) | $\mu i$ | Bs (mT) (23°C) | Bs (mT) (100°C) | $\rho$ ($\Omega$m) | $\mu i$ RATE OF CHANGE (%) |
|---|---|---|---|---|---|---|---|---|---|
| | $(Li_{0.5}Fe_{0.5})O$ | ZnO | $Fe_2O_3$** | $Bi_2O_3$ | | | | | |
| 20* | 33.9 | 16.9 | 49.2 | 0.00 | 204 | 452 | 405 | 1.5E+01 | 2.0 |
| 21* | 33.9 | 16.9 | 49.2 | 0.25 | 219 | 453 | 408 | 3.5E+03 | 3.1 |
| 22 | 33.9 | 16.9 | 49.2 | 0.50 | 229 | 452 | 406 | 5.4E+06 | 3.5 |
| 23 | 33.9 | 16.9 | 49.2 | 0.75 | 251 | 449 | 405 | 2.3E+07 | 2.3 |
| 24 | 33.9 | 16.9 | 49.2 | 1.25 | 251 | 443 | 400 | 1.4E+08 | 2.4 |
| 25 | 33.9 | 16.9 | 49.2 | 2.00 | 263 | 437 | 393 | 3.2E+08 | 2.4 |
| 26 | 33.9 | 16.9 | 49.2 | 3.00 | 258 | 432 | 387 | 2.8E+08 | 2.2 |
| 27* | 33.9 | 16.9 | 49.2 | 5.00 | 242 | 420 | 371 | 4.1E+08 | 1.6 |

**: THE AMOUNT OF $Fe_2O_3$ INCLUDED IN $(Li_{0.5}Fe_{0.5})O$ IS EXCLUDED.

F I G. 18
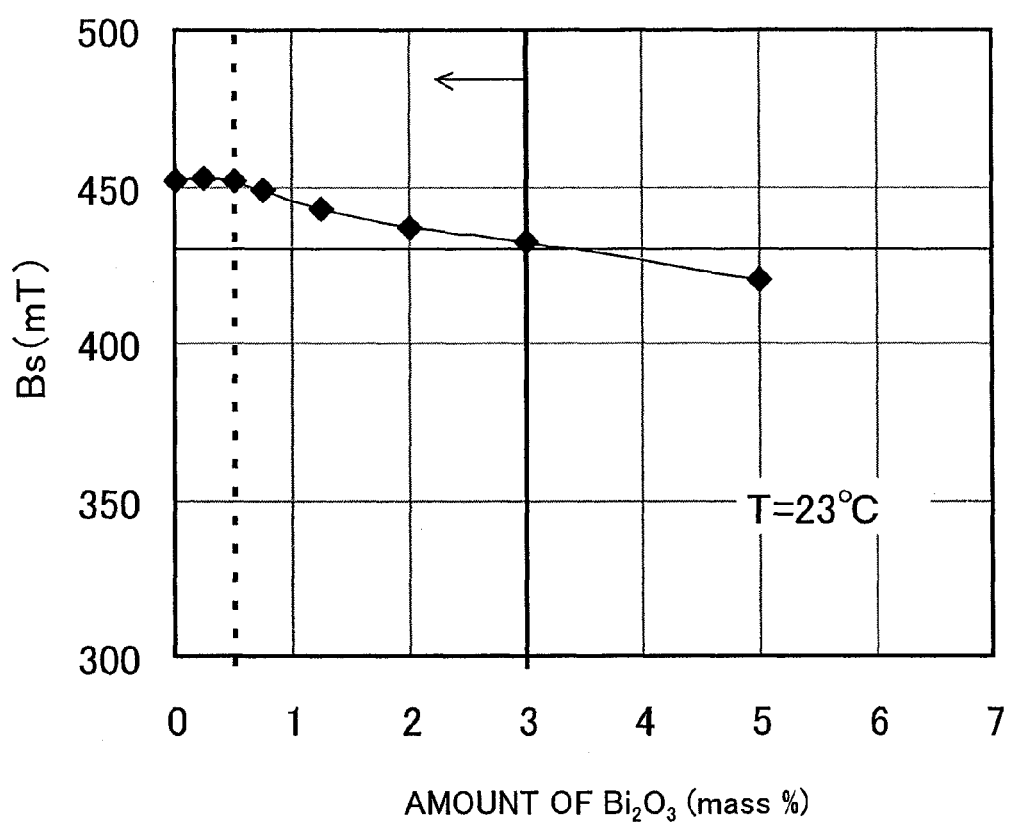

F I G. 2 0
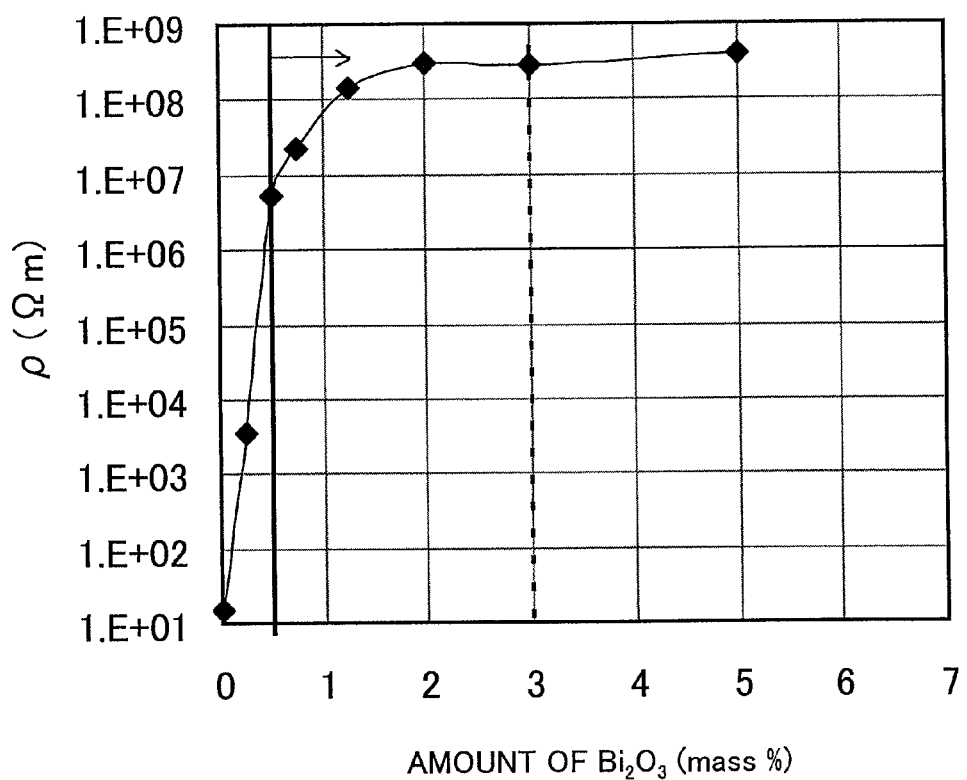
AMOUNT OF $Bi_2O_3$ (mass %)

FIG. 21

| SAMPLE NUMBER | COMPOSITION OF MAIN COMPONENT (mol%) | | | ACCESSORY COMPONENT (mass %) | AVERAGE CRYSTAL GRAIN SIZE ($\mu$m) | $\mu$i | Bs (mT) (23°C) | Bs (mT) (100°C) | $\rho$ ($\Omega$m) |
|---|---|---|---|---|---|---|---|---|---|
| | $(Li_{0.5}Fe_{0.5})O$ | ZnO | $Fe_2O_3$** | $Bi_2O_3$ | | | | | |
| 28* | 33.9 | 16.9 | 49.2 | 0.75 | 4.8 | 160 | 428 | 383 | 2.1E+07 |
| 29 | 33.9 | 16.9 | 49.2 | 0.75 | 9.5 | 218 | 438 | 392 | 2.4E+07 |
| 30 | 33.9 | 16.9 | 49.2 | 0.75 | 11.4 | 242 | 444 | 399 | 2.0E+07 |
| 31 | 33.9 | 16.9 | 49.2 | 0.75 | 14.8 | 251 | 449 | 405 | 2.3E+07 |
| 32 | 33.9 | 16.9 | 49.2 | 0.75 | 16.3 | 261 | 451 | 406 | 1.4E+07 |

**: THE AMOUNT OF $Fe_2O_3$ INCLUDED IN $(Li_{0.5}Fe_{0.5})O$ IS EXCLUDED.

F I G. 2 2
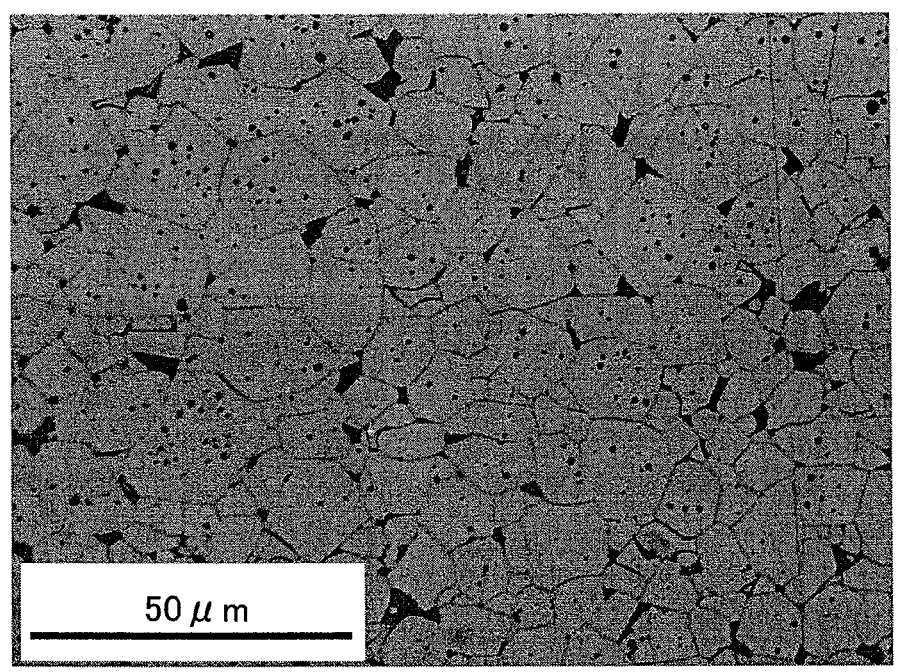

F I G. 2 3
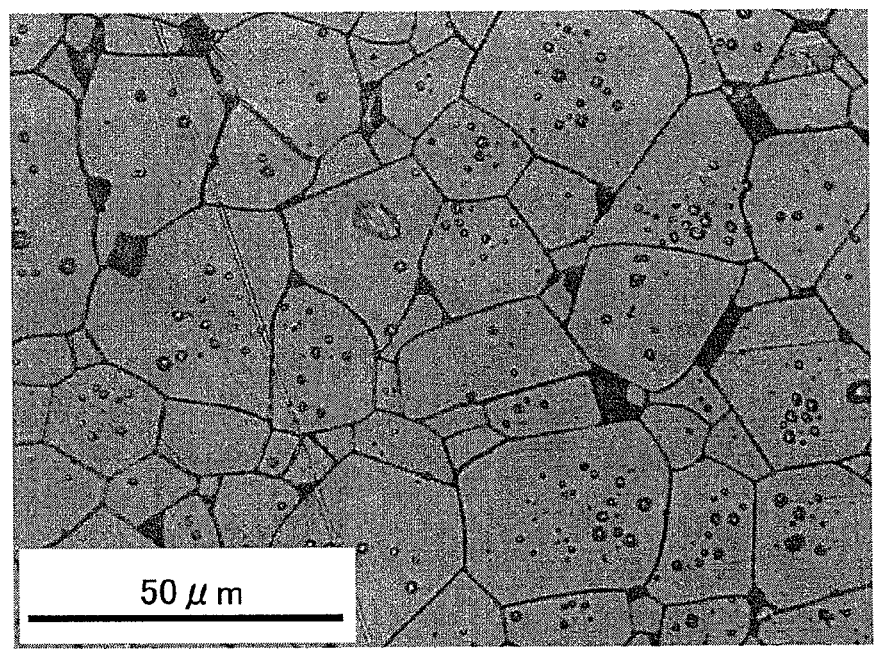

F I G. 2 4

| SAMPLE NUMBER | $\mu i$ | Bs (mT) (100°C) | DC SUPERPOSITION CHARACTERISTIC (100°C) (CURRENT VALUE I(A) TO BECOME $\Delta L/L_0 = -10\%$) |
|---|---|---|---|
| 33 | 251 | 405 | 0.65 |
| 34 | 235 | 398 | 0.63 |
| 35* | 258 | 329 | 0.31 |
| 36* | 352 | 341 | 0.42 |

FIG. 26

| SAMPLE NUMBER | $\mu i$ | Bs (mT) (23°C) | Bs (mT) (100°C) | DC SUPERPOSITION CHARACTERISTIC (100°C) (CURRENT VALUE I(A) TO BECOME $\Delta L/L_0 = -10\%$) | TEMPERATURE CHANGE OF L AT A LARGE AMPLITUDE CURRENT $(L_{100°C} - L_{23°C})/L_{23°C}$ (%) $(I_{0-P} = 1.5A)$ |
|---|---|---|---|---|---|
| 37 | 251 | 449 | 405 | 1.12 | −0.5 |
| 38 | 235 | 446 | 398 | 1.10 | −0.8 |
| 39* | 258 | 392 | 329 | 0.85 | −7.5 |
| 40* | 352 | 409 | 341 | 0.91 | −6.3 |

F I G. 2 7
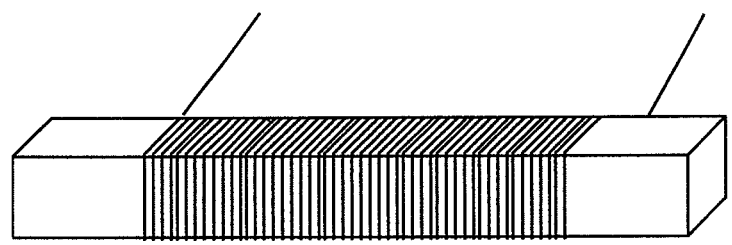

FIG. 28

| SAMPLE NUMBER | PRE-SINTERING TEMPERATURE (°C) | NUMBER OF GRAIN BOUNDARY PORES PER 100 CRYSTAL GRAINS | $\mu i$ RATE OF CHANGE (%) |
|---|---|---|---|
| 41 | 800 | 10 | 4.2 |
| 42 | 900 | 13 | 3.8 |
| 43 | 950 | 17 | 3.4 |
| 44 | 1000 | 22 | 2.6 |
| 45 | 1100 | 30 | 2.0 |
| 46 | 1200 | 34 | 1.6 |

F I G. 3 1
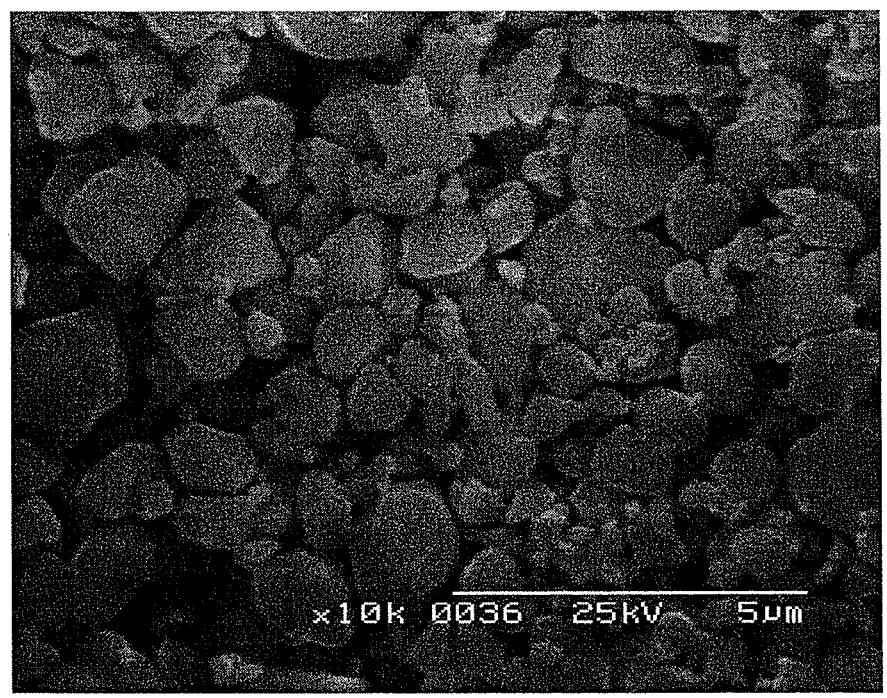

F I G. 3 2
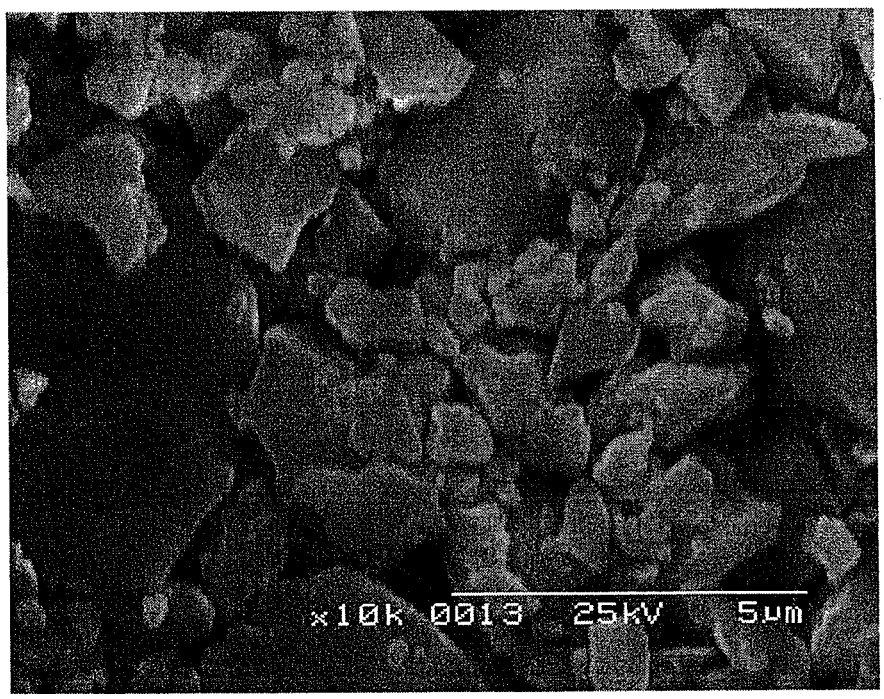

F I G. 3 3
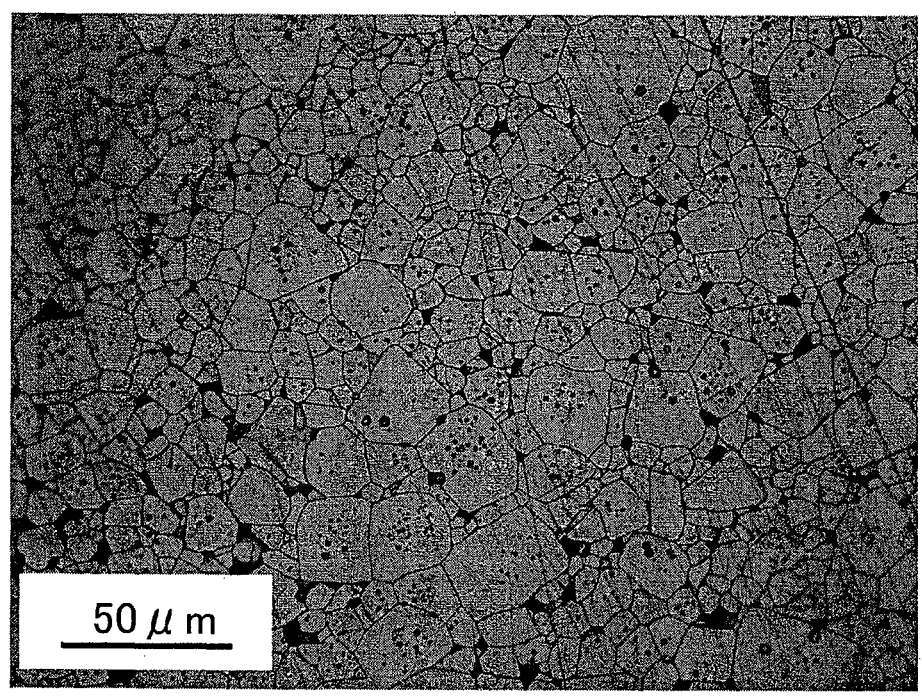

US 9,434,622 B2

SINTERED FERRITE MATERIAL, WIRE WOUND COMPONENT, AND PRODUCING METHOD OF SINTERED FERRITE MATERIAL

This application is the national phase under 35 U.S.C. §371 of PCT International Application No. PCT/JP2009/052365 which has an International filing date of Feb. 13, 2009 and designated the United States of America.

BACKGROUND

1. Technical Field

The present invention relates to a sintered ferrite material to be used for a core material of wire wound components including an inductor to be used for a power circuit or the like, an antenna such as a bar antenna, a transformer and the like, and in particular to a sintered ferrite material, which satisfies high initial permeability, high saturation magnetic flux density and high resistivity, a wire wound component, and a producing method of the sintered ferrite material.

2. Description of Related Art

Conventionally, a Ni-based ferrite material having high resistivity has been used for a ferrite material, which is to be used as a core material of wire wound components including an inductor to be used for a power circuit or the like of a DC-DC converter, an antenna such as a bar antenna, a transformer and the like, in order to ensure electrical insulation from a conductive material.

However, a Ni-based ferrite material, which contains expensive Ni as a main component and has a large magnetostriction constant, has a problem that the soft magnetic property is changed by stress on the core in the process of resin cure in a wire wound component of a resin mold type.

A Li-based ferrite material is known as a material, which does not contain expensive Ni. A Li-based ferrite material having a small magnetostriction constant is characterized in that the rate of change of the soft magnetic characteristic is small even when the Li-based ferrite material is used for a wire wound component of a resin mold type or the like.

However, when a Li-based ferrite material is sintered at a high temperature equal to or higher than 1000° C., it is difficult to obtain high resistivity (equal to or higher than $10^6$ Ωm, for example), though high initial permeability (equal to or higher than 200, for example) and high saturation magnetic flux density suitable for the use in an inductor, an antenna or the like can be obtained.

For example, a Li-based ferrite material for a non-reciprocal circuit element, which has a composition formula of $(1-x)Li_2O \cdot (5-2\alpha-x)Fe_2O_3 \cdot 4xZnO \cdot 4yMnO \cdot 4\beta Bi_2O_3$, satisfies $0 \leq \alpha \leq 0.35$, $0 \leq x \leq 0.45$, $0 \leq y \leq 0.2$ and $0 \leq \beta \leq 0.005$ and has composition wherein at least two of x, y and β are not zero simultaneously and α is not zero when y is zero, has been proposed as a Li-based ferrite material to be sintered at a high temperature equal to or higher than 1000° C. (Japanese Examined Patent Application Publication No. S55-27015).

It is stated in Japanese Examined Patent Application Publication No. S55-27015 that a Li-based ferrite material therein has characteristics, such as a temperature characteristic and a loss characteristic, enhanced by the condition that at least two of Zn, Mn and Bi are contained simultaneously and further has resistivity enhanced by the condition that heat treatment is applied at least one time in nitrogen and is applied for the last time in oxygen in the process of repeated heat treatment in oxygen and nitrogen.

However, a Li-based ferrite material according to Japanese Examined Patent Application Publication No. S55-27015 has low resistivity in the order of $10^7$ Ωcm ($10^5$ Ωm), though saturation magnetic flux density equal to or higher than 4000 G (400 mT) can be obtained. Moreover, heat treatment needs to be applied repeatedly in oxygen and nitrogen in order to enhance the resistivity, causing a problem that the manufacturing cycle increases in length and the manufacturing cost increases.

On the other hand, a Li-based ferrite material, which has resistivity enhanced to $10^6$ Ωm or higher by adding a sintering agent such as $Bi_2O_3$ and sintering the material at a low temperature (approximately 900° C.), has been proposed (Japanese Patent Application Laid-Open No. 2004-153197). However, such a Li-based ferrite material has a problem that the initial permeability is low.

Moreover, the use of a Li-based ferrite material, which is characterized by having a high squareness ratio, for a memory core material or the like has been conventionally considered. However, a Li-based ferrite material has a problem that the saturation magnetic flux density is lower than that of a Ni-based ferrite material. Accordingly, the saturation magnetic flux density needs to be enhanced for the use in an inductor, an antenna or the like, which requires a satisfactory DC superposition characteristic.

SUMMARY

As described above, a Li-based ferrite material, which satisfies all of high initial permeability, high saturation magnetic flux density and high resistivity, has not yet been proposed conventionally.

The object of the present invention is to provide, at low cost, a Li-based sintered ferrite material, which satisfies all of high initial permeability, high saturation magnetic flux density and high resistivity most suitable for a core material of a wire wound component such as an inductor, an antenna or a transformer of various types such as a direct winding type requiring no bobbin that needs to have high resistivity, a gap type that is to be used in a DC biasing magnetic field where high initial permeability and high saturation magnetic flux density are required and a resin mold type that requires high resistance to stress, and has high saturation magnetic flux density even at a relatively high temperature to be used for the respective uses.

As a result of earnest study of the composition of a Li-based ferrite material aiming at the object described above, the present inventors have found the presence of a composition range, which can satisfy all of high initial permeability, high saturation magnetic flux density and high resistivity, and, moreover, have achieved the present invention by confirming that the above composition enables provision of a Li-based ferrite material having excellent characteristics at low cost even without applying complicated heat treatment or the like.

A sintered ferrite material of the present invention is characterized by: being obtained by adding $Bi_2O_3$ in a range from 0.5% by mass to 3% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 \leq z \leq 0.03$; and satisfying initial permeability equal to or higher than 200, saturation magnetic flux density equal to or higher than 430 mT at 23° C. and equal to or higher than 380 mT at 100° C. and resistivity equal to or higher than $10^6$ Ωm.

The present invention is a sintered ferrite material having the structure described above, characterized in that an average crystal grain size is in a range from 7.5 μm to 25 μm.

The present invention is a sintered ferrite material having the structure described above, characterized in that a rate of change of initial permeability under a pressure of 30 MPa is within ±5%.

The present invention is a sintered ferrite material having the structure described above, characterized in that the number of grain boundary pores per 100 crystal grains is equal to or larger than 20.

The present invention is a sintered ferrite material having the structure described above, characterized in that a rate of change of initial permeability under a pressure of 30 MPa is within ±3%.

The present invention is a wire wound component comprising a core and a wire which is wound on said core, characterized in that said core comprises a sintered ferrite material having the structure described above.

A producing method of a sintered ferrite material of the present invention is characterized by comprising: a step of preparing raw powder to obtain a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 \leq z \leq 0.03$; a step of pre-sintering the raw powder to obtain first pre-sintered powder; a step of adding $Bi_2O_3$ in a range from 0.5% by mass to 3% by mass against 100% by mass of the first pre-sintered powder to obtain second pre-sintered powder; a step of pulverizing the second pre-sintered powder to obtain pulverized powder; a step of forming the pulverized powder to obtain a compact; and a step of sintering the compact to obtain a sintered ferrite material.

A producing method of a sintered ferrite material of the present invention is characterized by comprising: a step of preparing raw powder obtained by adding $Bi_2O_3$ in a range from 0.5% by mass to 3% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 \leq z \leq 0.03$; a step of pre-sintering the raw powder to obtain pre-sintered powder; a step of pulverizing the pre-sintered powder to obtain pulverized powder; a step of forming the pulverized powder to obtain a compact; and a step of sintering the compact to obtain a sintered ferrite material.

The present invention is a producing method of a sintered ferrite material comprising the steps described above, characterized in that a pre-sintering temperature for pre-sintering the raw powder is 800° C.-1200° C., or preferably 1000° C.-1200° C.

The present invention can provide a sintered ferrite material, which satisfies initial permeability equal to or higher than 200, saturation magnetic flux density equal to or higher than 430 mT at 23° C. and equal to or higher than 380 mT at 100° C. and resistivity equal to or higher than $10^6$ Ωm.

When a sintered ferrite material according to the present invention is used for a core material of wire wound components including an inductor to be used for a power circuit or the like of a DC-DC converter, an antenna such as a bar antenna, a transformer and the like, direct winding on a core becomes possible eliminating the need for a bobbin and therefore it becomes possible to reduce the manufacturing cost of a wire wound component and, furthermore, to downsize the wire wound component.

It is possible to provide an inexpensive inductor or an inexpensive antenna, which has an excellent DC superposition characteristic, by using a sintered ferrite material according to the present invention, which has high saturation magnetic flux density even at a high temperature, for a core material of the inductor or the antenna.

It is possible to provide a wire wound component, which has a small rate of change of permeability against external stress and therefore has reduced dispersion of a soft magnetic characteristic, by using a sintered ferrite material according to the present invention as a core material of a wire wound component of a resin mold type.

The present invention, which does not need complicated heat treatment or the like, can provide, at low cost, a Li-based sintered ferrite material, which satisfies the characteristics described above.

With the present invention wherein the pre-sintering temperature is 800° C.-1200° C., or preferably 1000° C.-1200° C., it is possible to reduce the rate of change of the initial permeability of a sintered ferrite material to be manufactured.

The above and further objects and features will more fully be apparent from the following detailed description with accompanying drawings.

BRIEF DESCRIPTION OF THE SEVERAL VIEWS OF THE DRAWINGS

FIG. 1 is a diagram for illustrating the composition and the characteristics of sintered ferrite materials in Example 1.

FIG. 3 is a graph for illustrating the relation between the amount of ZnO and the saturation magnetic flux density at 23° C. of the sintered ferrite materials.

FIG. 6 is a diagram for illustrating the composition and the characteristics of sintered ferrite materials in Example 2.

FIG. 11 is a diagram for illustrating the composition and the characteristics of sintered ferrite materials in Example 3.

FIG. 12 is a graph for illustrating the relation between the amount of CuO and the initial permeability of the sintered ferrite materials.

FIG. 14 is a graph for illustrating the relation between the amount of CuO and the saturation magnetic flux density at 100° C. of the sintered ferrite materials.

FIG. 15 is a graph for illustrating the relation between the amount of CuO and the resistivity of the sintered ferrite materials.

FIG. 16 is a diagram for illustrating the composition and the characteristics of sintered ferrite materials in Example 4.

FIG. 18 is a graph for illustrating the relation between the amount of $Bi_2O_3$ and the saturation magnetic flux density at 23° C. of the sintered ferrite materials.

FIG. 20 is a graph for illustrating the relation between the amount of $Bi_2O_3$ and the resistivity of the sintered ferrite materials.

FIG. 21 is a diagram for illustrating the composition and the characteristics of sintered ferrite materials in Example 5.

FIG. 22 is a view of a photograph of structure of a sintered ferrite material in a comparison example.

FIG. 23 is a view of a photograph of structure of a sintered ferrite material of the present invention.

FIG. 24 is a diagram for illustrating the characteristics of inductors in Example 6.

FIG. 26 is a diagram for illustrating the characteristics of antennas in Example 7.

FIG. 27 is a schematic view for illustrating the structure of an antenna.

FIG. 28 is a diagram for illustrating the characteristics of sintered ferrite materials in Example 8.

FIG. 31 is a view of an SEM photograph of pulverized powder according to the present invention.

FIG. 32 is a view of an SEM photograph of pulverized powder according to the present invention.

FIG. 33 is a view of a photograph of structure of a sintered ferrite material of the present invention.

DETAILED DESCRIPTION

Figure 2:
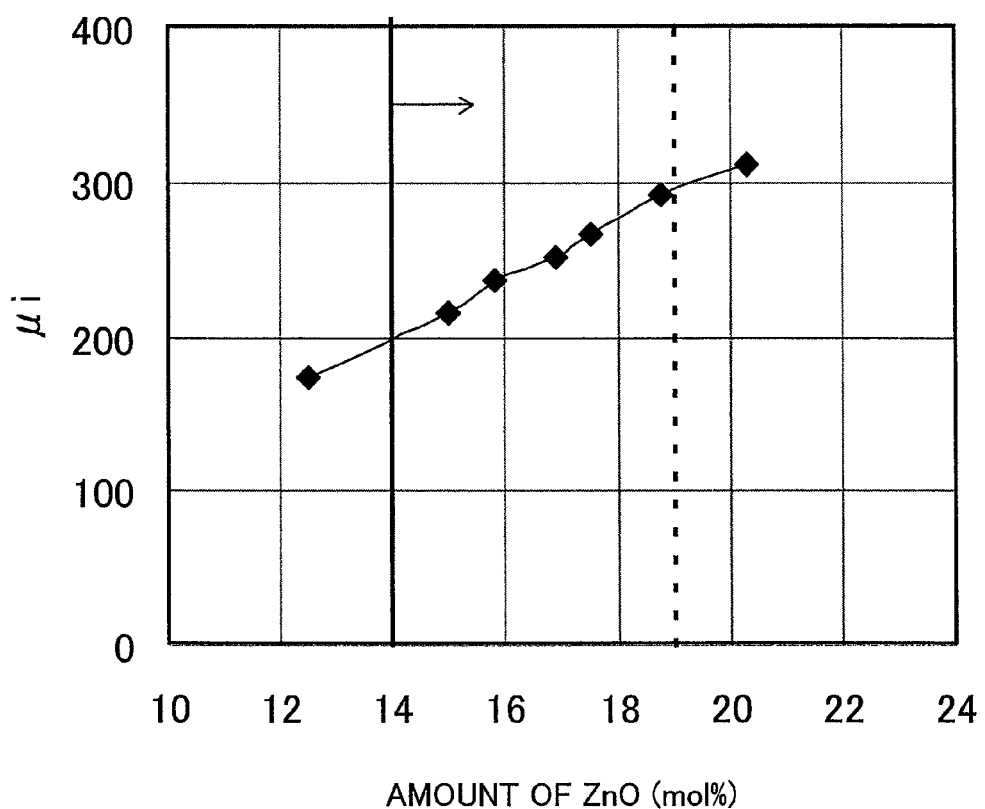
FIG. 2 is a graph for illustrating the relation between the amount of ZnO and the initial permeability of the sintered ferrite materials.

A sintered ferrite material of the present invention is characterized by being obtained by adding $Bi_2O_3$ in a range from 0.5% by mass to 3% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \le x \le 0.19$, $0.48 \le y < 0.5$ and $0 \le z \le 0.03$.

A Li-based ferrite material described in claims in Japanese Examined Patent Application Publication No. S55-27015 described above has a composition formula of $(1-x)Li_2O \cdot (5-2\alpha-x)Fe_2O_3 \cdot 4xZnO \cdot 4yMnO \cdot 4\beta Bi_2O_3$ wherein $0 \le \alpha \le 0.35$, $0 \le x \le 0.45$, $0 \le y \le 0.2$ and $0 \le \beta \le 0.005$ are satisfied, at least two of x, y and β are not zero simultaneously and α is not zero when y is zero.

As stated that "at least two of x, y and β are not zero simultaneously", Mn and Zn, Zn and Bi, Mn and Bi, or Mn and Zn and Bi need to be contained simultaneously in Japanese Examined Patent Application Publication No. S55-27015, though most examples in Japanese Examined Patent Application Publication No. S55-27015 contain Mn. Only Sample Number MLF-37 in the third table does not contain Mn in the examples. The third table is explained as "the DC resistance however becomes extremely low and applicability as a microwave circuit is lost when Y=0 or when Mn is not contained". For comparison, when the composition of the Sample Number MLF-37 mentioned above is converted to a composition formula of the present invention, $Fe_2O_3=0.5$, $(Li_{0.5}Fe_{0.5})O=0.3$ and $ZnO=0.2$ are obtained.

As described above, a sintered ferrite material according to the present invention does not contain MnO (except when MnO gets mixed in as unavoidable impurity). Moreover, the upper limit of ZnO is 0.19 and the upper limit of $Fe_2O_3$ is 0.5 (excluding 0.5). Furthermore, as shown in examples to be described later, the present invention realizes high resistivity equal to or higher than $10^6$ Ωm, though MnO is not contained. The composition of a sintered ferrite material according to the present invention has been found as a result of earnest study of the composition of a Li-based ferrite material, which can satisfy all of high initial permeability, high saturation magnetic flux density and high resistivity, in consideration of a conventional Li-based ferrite material.

The following description will explain in detail the reason for limiting the composition of a sintered ferrite material of Claim 1 in the present invention.

The content rate of ZnO is denoted by "x", which is preferably in a range of 0.14-0.19 (this means equal to or higher than 0.14 and equal to or lower than 0.19, the symbol "-" has the same meaning in the following description). When "x" is lower than 0.14, it is unfavorable since the initial permeability becomes low and falls below 200. When "x" exceeds 0.19, it is also unfavorable since the saturation magnetic flux density becomes low and falls below 430 mT at 23° C. and below 380 mT at 100° C. A more preferable range is 0.16-0.17, which realizes characteristics of initial permeability equal to or higher than 250, saturation magnetic flux density equal to or higher than 440 mT at 23° C. and equal to or higher than 400 mT at 100° C. and resistivity equal to or higher than $10^6$ Ωm.

The content rate corresponding to $Fe_2O_3$ except the content rate of Fe included in $(Li_{0.5}Fe_{0.5})O$ is denoted by "y", which is preferably in a range from 0.48 to less than 0.5 and can satisfy initial permeability equal to or higher than 200, saturation magnetic flux density equal to or higher than 430 mT at 23° C. and equal to or higher than 380 mT at 100° C. and resistivity equal to or higher than $10^6$ Ωm. When "y" is lower than 0.48, it is unfavorable since the saturation magnetic flux density becomes low and falls below 430 mT at 23° C. and below 380 mT at 100° C. When "y" is equal to or higher than 0.5, it is also unfavorable since the resistivity falls below $10^6$ Ωm. In particular, when "y" is equal to or higher than 0.5, the resistivity falls abruptly. Accordingly, "y" is preferably kept lower than 0.5 in order to obtain stable resistivity. A more preferable range is 0.485-0.495, which realizes characteristics of initial permeability equal to or higher than 250, saturation magnetic flux density equal to or higher than 440 mT at 23° C. and equal to or higher than 400 mT at 100° C. and resistivity equal to or higher than $10^6$ Ωm, and a material having such "y" is an optimum material for an inductor or an antenna, which requires an excellent DC superposition characteristic. It is to be noted that $(Li_{0.5}Fe_{0.5})O$ is the rest of "x" and "y" described above and "z", which will be described later.

The content rate of CuO is denoted by "z", which is preferably equal to or lower than 0.03 when CuO is added. Addition of CuO can further enhance the resistivity, though the present invention can realize excellent characteristics even without addition of CuO. Moreover, as described above, CuO is for displacing a part of $(Li_{0.5}Fe_{0.5})O$, and addition of CuO produces effects that high characteristics can be maintained even when the additive amount of $Bi_2O_3$, which will be described later, is reduced, and a sintered ferrite can be provided at low cost because of reduction of the amount of $Bi_2O_3$. When "z" exceeds 0.03, it is unfavorable since the saturation magnetic flux density becomes low and falls below 430 mT at 23° C. and below 380 mT at 100° C. A more preferable range is equal to or lower than 0.02.

$Bi_2O_3$ is further added in the proportion of 0.5% by mass-3% by mass to 100% by mass of the material having the composition described above. High resistivity can be obtained even after high-temperature sintering by adding $Bi_2O_3$ in the proportion of 0.5% by mass-3% by mass to the material having the composition formula described above, though it has been conventionally difficult to obtain resistivity equal to or higher than $10^6$ Ωm with a Li-based ferrite material after sintering at a high temperature equal to or higher than 1000° C. When the content rate of $Bi_2O_3$ is lower than 0.5% by mass, it is unfavorable since enhancement of the resistivity cannot be achieved. When the content rate of $Bi_2O_3$ exceeds 3% by mass, it is also unfavorable since the saturation magnetic flux density falls. A more preferable range is 0.5% by mass-1.25% by mass. It is to be noted that $Bi_2O_3$ is preferably added after a pre-sintering step and before a sintering step in a producing method, which will be described later.

When the reason for limiting the composition described above is satisfied, a sintered ferrite material, which satisfies initial permeability equal to or higher than 200, saturation magnetic flux density equal to or higher than 430 mT at 23° C. and equal to or higher than 380 mT at 100° C. and resistivity equal to or higher than $10^6$ Ωm, can be obtained. It is to be noted that mixing of unavoidable impurity into a sintered ferrite material according to the present invention can be allowed. For example, MnO is not an essential element for a sintered ferrite material according to the present invention but may as well be mixed in as impurity.

A sintered ferrite material according to the present invention can be obtained by the following producing method.

First, a material is prepared by adding $Bi_2O_3$ in a range from 0.5% by mass to 3% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 \leq z \leq 0.03$.

The step of preparing the material described above may be performed at any time before a sintering step, which will be described later. That is, the material described above may be prepared at any step in weighing, mixing, pre-sintering, pulverizing and forming. For example, carbonate powder and oxide powder, which are to be the starting materials of all elements, may be weighed, mixed and pre-sintered first, or only raw powder other than raw powder of Bi, Li and the like may be first weighed, mixed and pre-sintered and then raw powder of Bi, Li and the like may be mixed into the pre-sintered powder and then pulverized and formed. Alternatively, sintering may be performed after mixing into pulverized powder obtained by pulverizing.

The pre-sintering temperature for the pre-sintering step is preferably 800° C.-1200° C. A more preferable range is 1000° C.-1200° C. The mixed raw powder described above is heated in the pre-heating step to form a ferrite layer by solid phase reaction (ferritization reaction). The pre-heating time is preferably 2 hours-5 hours. Moreover, the pre-heating atmosphere is preferably the atmospheric air or oxygen.

A sintered ferrite material of the present invention is characterized by having excellent initial permeability, excellent saturation magnetic flux density and excellent resistivity and having also a small rate of change of the initial permeability against external stress. Employment of the composition range described above, pre-sintering at 800° C.-1200° C. and steps, which will be described later, provide a sintered ferrite material having a rate of change of initial permeability within ±5% under a pressure of 30 MPa and, moreover, pre-sintering at a relatively high temperature of 1000° C.-1200° C. can further reduce the rate of change of the initial permeability against external stress and provide a sintered ferrite material having a rate of change of initial permeability within ±3% under a pressure of 30 MPa.

When being pre-sintered at a relatively high temperature of 1000° C.-1200° C., powders, which have finished ferritization reaction, form a neck and binding of powders proceeds. Accordingly, the powder becomes resistant to pulverizing in a pulverizing step, which will be described later, and becomes pulverized powder, which includes relatively large powders and relatively small powders or lacks sharpness in so-called grain size distribution.

Forming and sintering of the above pulverized powder can increase the number of pores to be formed in the crystal grain boundary and absorb external stress by the increase in the number of grain boundary pores and, therefore, the rate of change of the initial permeability against external stress can be further reduced.

Pulverizing in the pulverizing step is preferably performed in pure water or ethanol. Moreover, the average grain size of the pulverized powder, which is to be obtained by pulverizing, is preferably 0.5 μm-2.0 μm.

The pulverized powder, which has been obtained by pulverizing, is formed by desired forming means. Before forming, the pulverized powder may be granulated by a granulating machine as need arises. The forming pressure is preferably 70 MPa-150 MPa.

A compact obtained as described above is sintered to obtain a sintered ferrite material. The sintering temperature is preferably 1000° C.-1150° C. When the sintering temperature is lower than 1000° C., it is unfavorable since the initial permeability becomes low. When the sintering temperature exceeds 1150° C., it is also unfavorable since Bi in the compact may possibly volatilize and contaminate the inside of the furnace. A more preferable range is 1050° C.-1100° C. The sintering atmosphere is preferably the atmospheric air or oxygen and the sintering time is preferably 2-5 hours.

With a sintered ferrite material according to the present invention, it is possible to enhance the initial permeability and the saturation magnetic flux density without lowering the resistivity, by adjusting the average crystal grain size after sintering to be in a range from 7.5 μm to 25 μm. It has been commonly believed that it is preferable to reduce the average crystal grain size and increase the grain boundary resistivity in order to obtain high resistivity. However, a sintered ferrite material according to the present invention has proved that it is possible to enhance the initial permeability and the saturation magnetic flux density without lowering the resistivity when the average crystal grain size is made larger than a conventional material. This is regarded as being attributed to the composition range of a sintered ferrite material according to the present invention and is an effect specific to the present invention.

When the average crystal grain size is equal to or larger than 7.5 μm, it is preferable since enhancement of the initial permeability and the saturation magnetic flux density can be achieved. When the average crystal grain size exceeds 25 μm, it is unfavorable since the resistivity lowers. The average crystal grain size can be adjusted by the pre-sintering temperature, pre-sintering time, pulverizing grain size, sintering temperature and sintering time described above.

EXAMPLES

Example 1

The present example is to demonstrate the reason for limiting the composition of x(ZnO).

In order to finally obtain various compositions illustrated in FIG. 1 ((Li$_{0.5}$Fe$_{0.5}$)O, ZnO, Fe$_2$O$_3$ and CuO in the respective diagrams illustrating all of the following examples are described with mol %. 0.01 of x, y and z in a composition formula corresponds to 1 mol %.), carbonate powder and oxide powder, which are to be the starting materials, were weighed and mixed, and were pre-sintered for 3 hours at 1000° C. in the atmosphere to obtain pre-sintered powder (first pre-sintered powder). Bi$_2$O$_3$ was further added in the proportion of 0.75% by mass to 100% by mass of the obtained pre-sintered powder (first pre-sintered powder) to obtain pre-sintered powder (second pre-sintered powder). Said pre-sintered powder (second pre-sintered powder) was pulverized in a ball mill by wet pulverizing to obtain a size of from 0.5 μm to 2 μm and was then dried.

Polyvinyl alcohol was added in the proportion of 1% by mass to the obtained powder and was granulated to obtain granulated powder. The granulated powder was formed into a ring shape of outer diameter 9 mm×inner diameter 4 mm×thickness 3 mm, a plate shape of 30 mm×20 mm×thickness 5 mm and a frame shape of outer edge 9.5 mm×inner edge 4.7 mm×thickness 2.4 mm under a forming pressure of 150 MPa. Obtained compacts were sintered for 3 hours at 1050° C. in the atmosphere to obtain sintered ferrite materials.

Winding was applied to an obtained sintered ferrite material in a ring shape and the initial permeability was measured at the room temperature (23° C.) by an LCR meter (produced by HEWLETT PACKARD, having a device name of 4285A) with f=100 kHz. Moreover, BH loop of 4000 A/m was measured. The measurement result is illustrated in FIG. 1.

Moreover, a sample of 17 mm×2 mm×thickness 2 mm was cut out of an obtained sintered ferrite material in a plate shape, both ends thereof were coated with electrically conductive paste, and the resistance of the sample was measured at the room temperature (23° C.) by a two-terminal method. The measurement result is illustrated in FIG. 1. It is to be noted that the value of the resistivity ρ (Ωm) is represented in the following respective diagrams as 2.4E+07 when the value is 2.4×10$^7$, for example.

Moreover, winding was applied to an obtained sintered ferrite material in a frame shape and the initial permeability was measured by the same LCR meter as the one described above. Moreover, a uniaxial pressure of 30 MPa was applied and the rate of change from the initial permeability before and after pressurization was obtained. The measurement result is illustrated in FIG. 1.

Figure 4:
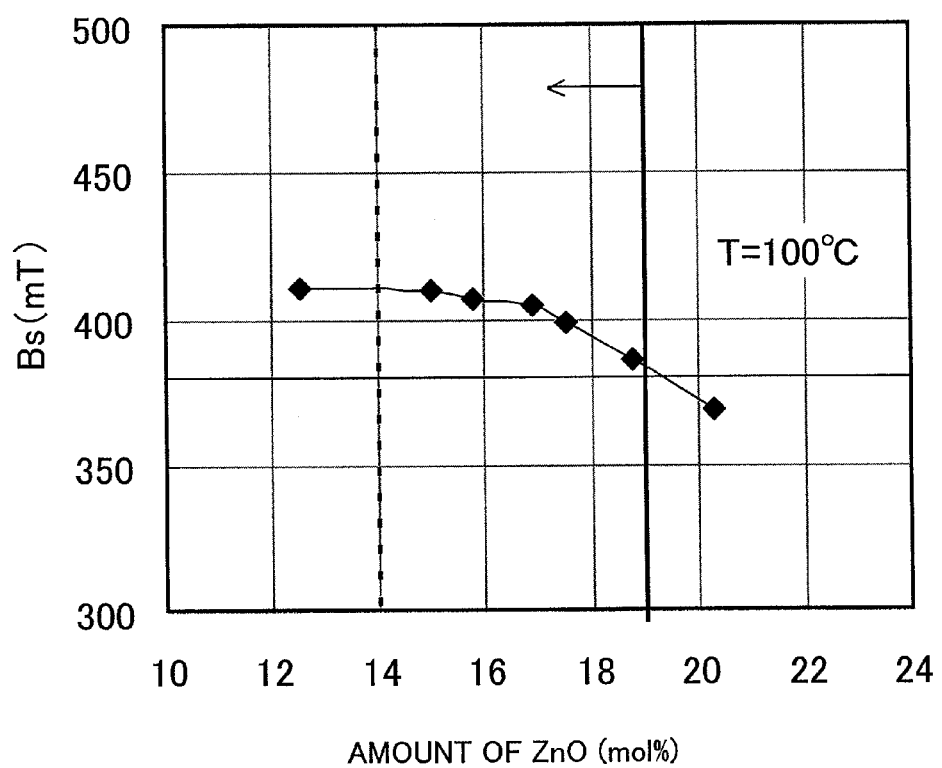
FIG. 4 is a graph for illustrating the relation between the amount of ZnO and the saturation magnetic flux density at 100° C. of the sintered ferrite materials.
Figure 5:
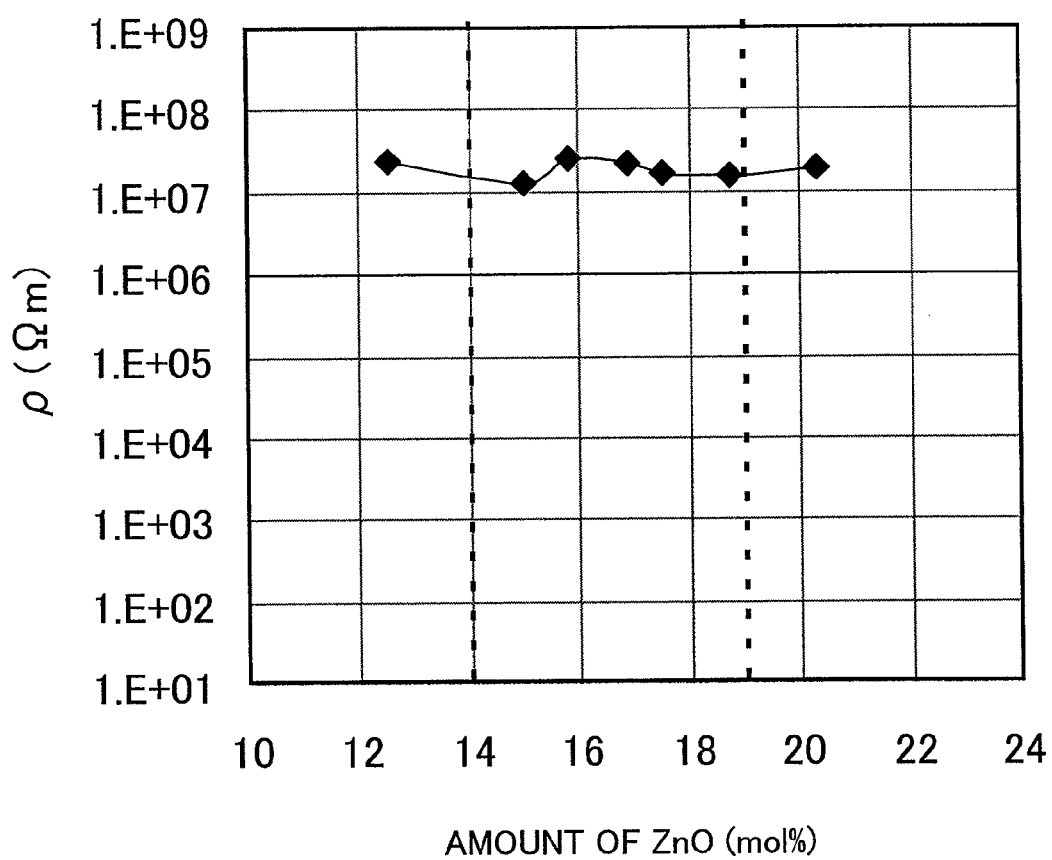
FIG. 5 is a graph for illustrating the relation between the amount of ZnO and the resistivity of the sintered ferrite materials.

It is to be noted that each symbol "*" attached beside sample numbers in FIG. 1 indicates a comparison example (the symbol "*" has the same meaning in the following description). Moreover, graphs showing the result in FIG. 1 are illustrated in FIGS. 2 to 5. The amount of ZnO is shown in the horizontal axes of the respective graphs, and FIG. 2 is a graph for illustrating a change in the initial permeability (μi), FIG. 3 is a graph for illustrating a change in the saturation magnetic flux density (Bs) at 23° C., FIG. 4 is a graph for illustrating a change in the saturation magnetic flux density (Bs) at 100° C. and FIG. 5 is a graph for illustrating a change in the resistivity (ρ).

As is clear from FIGS. 1 to 5, the content rate of ZnO within the range of 0.14-0.19 realizes high characteristics of initial permeability equal to or higher than 200, saturation magnetic flux density equal to or higher than 430 mT at 23° C. and equal to or higher than 380 mT at 100° C., and resistivity equal to or higher than 10$^6$ Ωm. Moreover, the result in FIG. 1 shows that a change in the initial permeability against stress of a sintered ferrite material of the present invention is small.

Example 2

The Present Example is to Demonstrate the Reason for limiting the composition of y(Fe$_2$O$_3$).

Figure 7:
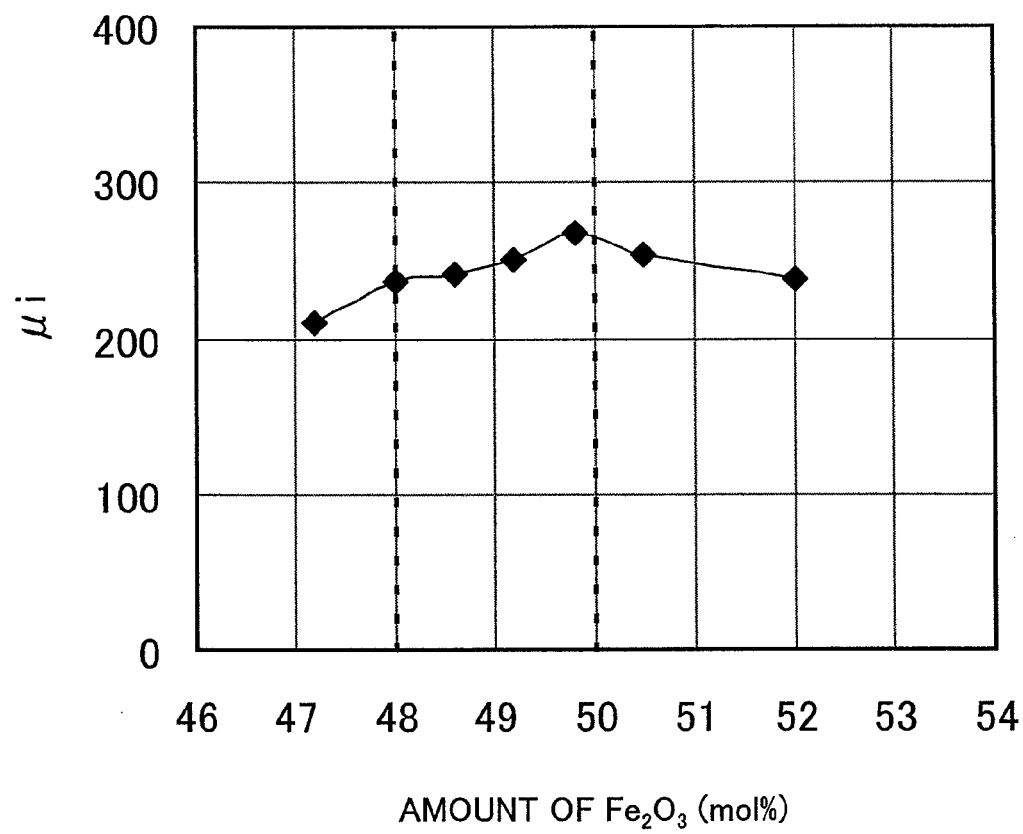
FIG. 7 is a graph for illustrating the relation between the amount of $Fe_2O_3$ and the initial permeability of the sintered ferrite materials.
Figure 8:
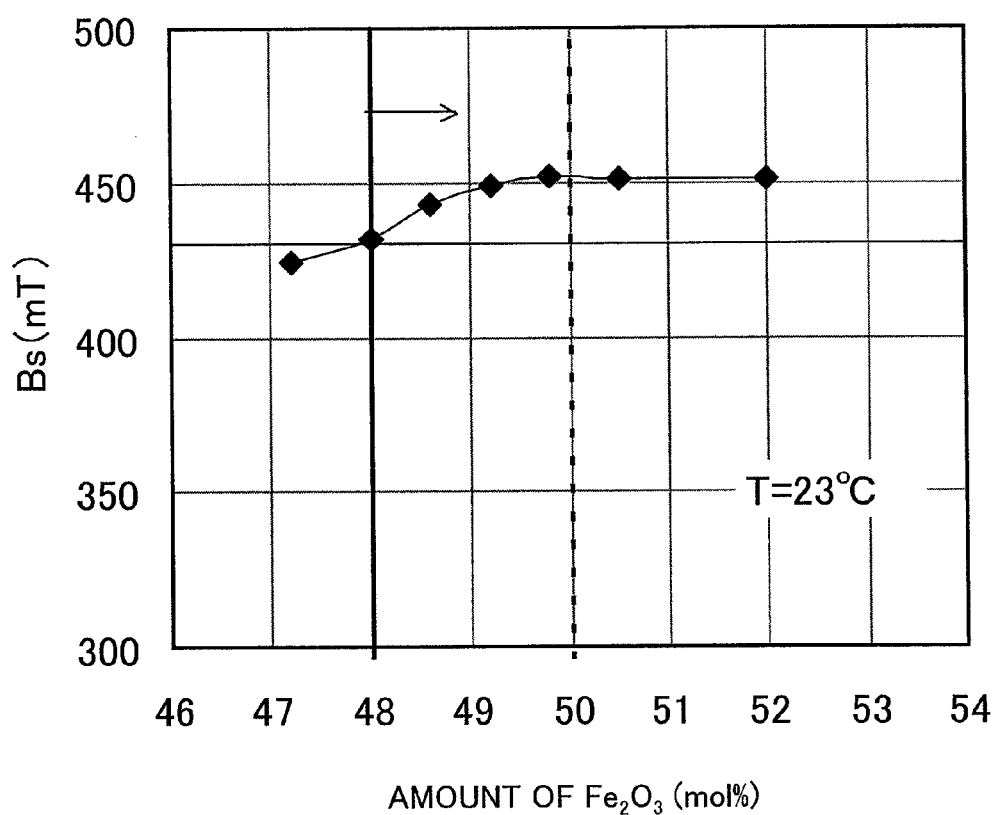
FIG. 8 is a graph for illustrating the relation between the amount of $Fe_2O_3$ and the saturation magnetic flux density at 23° C. of the sintered ferrite materials.
Figure 9:
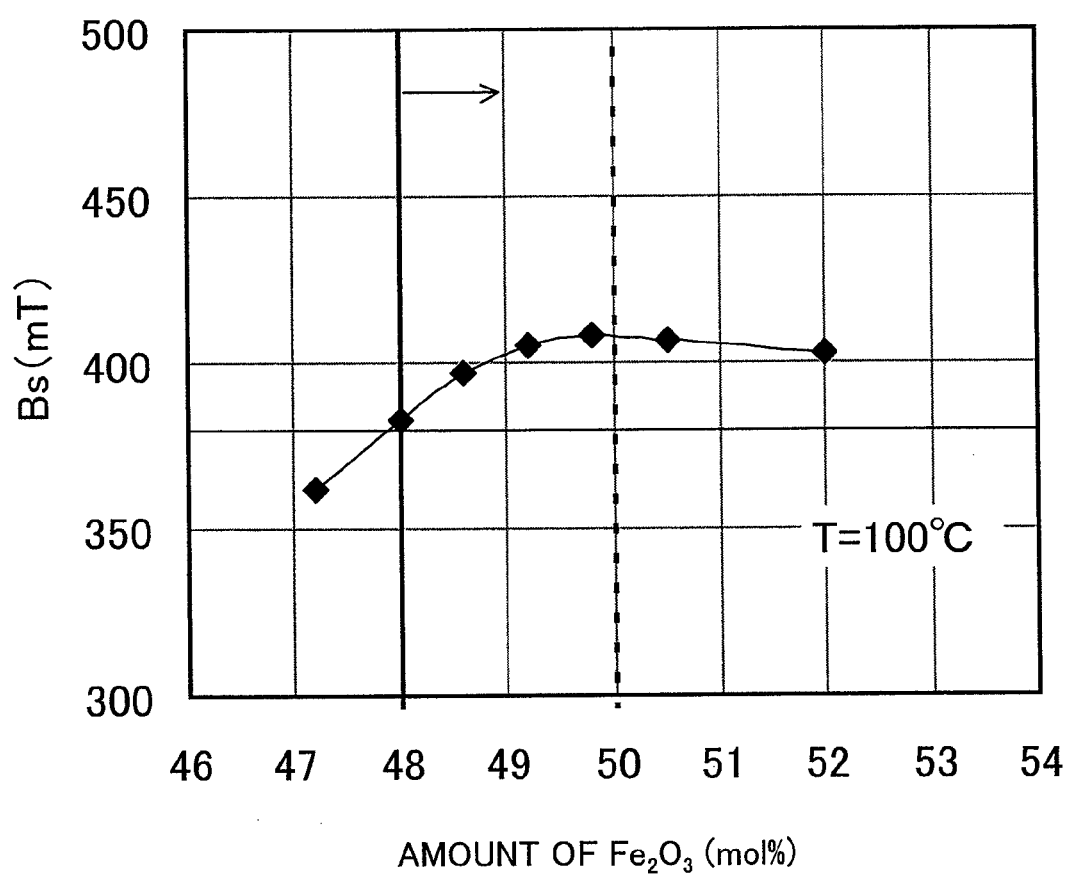
FIG. 9 is a graph for illustrating the relation between the amount of $Fe_2O_3$ and the saturation magnetic flux density at 100° C. of the sintered ferrite materials.
Figure 10:
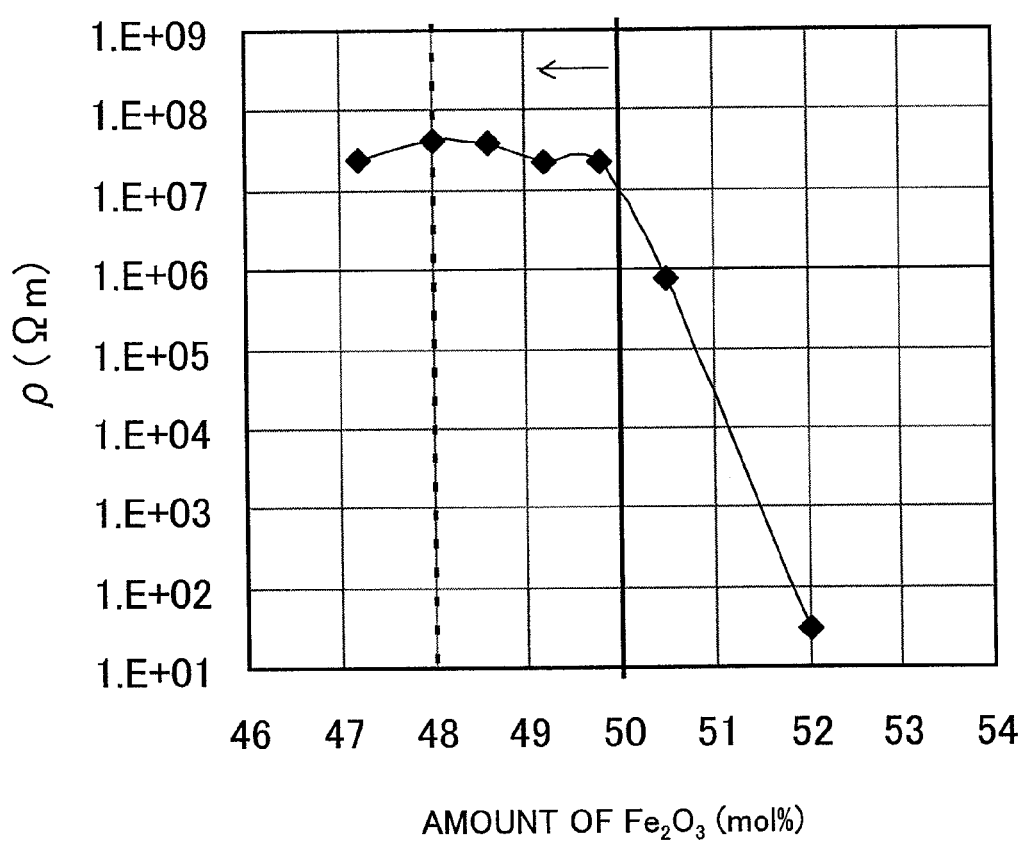
FIG. 10 is a graph for illustrating the relation between the amount of $Fe_2O_3$ and the resistivity of the sintered ferrite materials.

Experiments were conducted in the same way as that of Example 1, except that various final compositions illustrated in FIG. 6 were used. The result is illustrated in FIG. 6. Moreover, graphs showing the result in FIG. 6 are illustrated in FIGS. 7 to 10. The amount of Fe$_2$O$_3$ is shown in the horizontal axes of the respective graphs, and FIG. 7 is a graph for illustrating a change in the initial permeability, FIG. 8 is a graph for illustrating a change in the saturation magnetic flux density at 23° C., FIG. 9 is a graph for illustrating a change in the saturation magnetic flux density at 100° C. and FIG. 10 is a graph for illustrating a change in the resistivity.

As is clear from FIGS. 6 to 10, the content rate of Fe$_2$O$_3$ in a range from 0.48 to less than 0.5 realizes high characteristics of initial permeability equal to or higher than 200, saturation magnetic flux density equal to or higher than 430 mT at 23° C. and equal to or higher than 380 mT at 100° C., and resistivity equal to or higher than 10$^6$ Ωm. Moreover, the result in FIG. 6 shows that a change in the initial permeability against stress of a sintered ferrite material of the present invention is small.

Example 3

The present example is to demonstrate the reason for limiting the composition of z(CuO).

Figure 13:
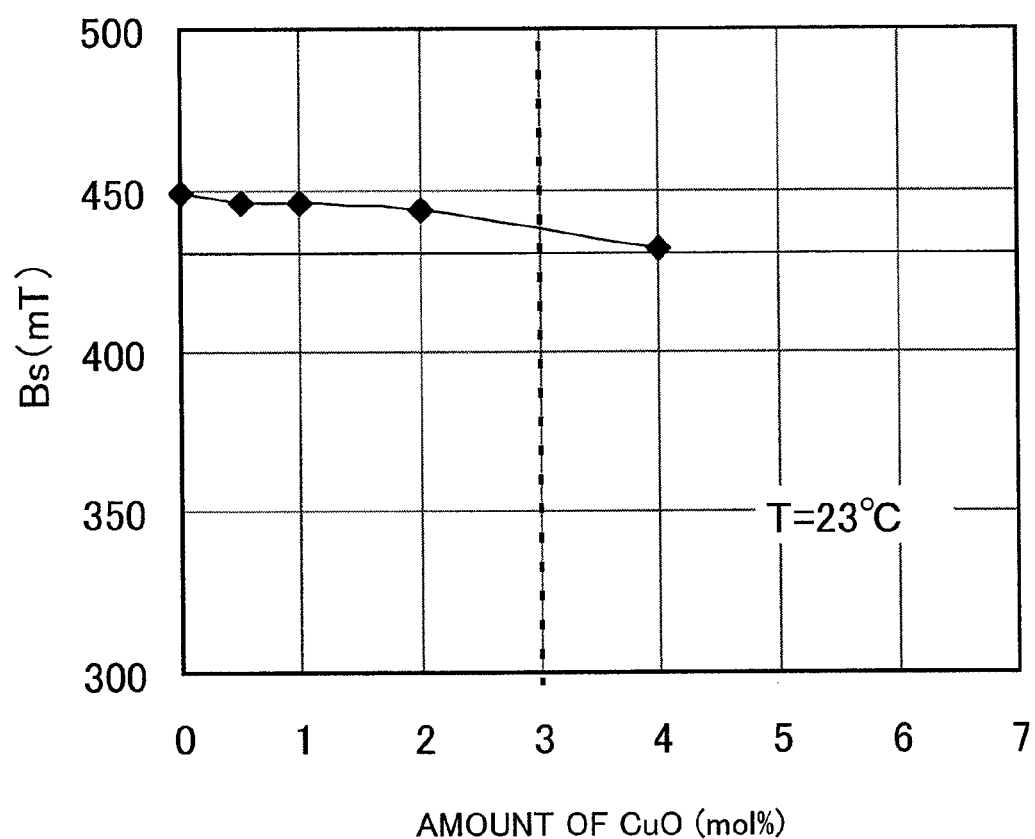
FIG. 13 is a graph for illustrating the relation between the amount of CuO and the saturation magnetic flux density at 23° C. of the sintered ferrite materials.

Experiments were conducted in the same way as that of Example 1, except that various final compositions illustrated in FIG. 11 were used. The result is illustrated in FIG. 11. Moreover, graphs showing the result in FIG. 11 are illustrated in FIGS. 12 to 15. The amount of CuO is shown in the horizontal axes of the respective graphs, and FIG. 12 is a graph for illustrating a change in the initial permeability, FIG. 13 is a graph for illustrating a change in the saturation magnetic flux density at 23° C., FIG. 14 is a graph for illustrating a change in the saturation magnetic flux density at 100° C. and FIG. 15 is a graph for illustrating a change in the resistivity.

As is clear from FIGS. 11 to 15, the content of CuO equal to or lower than 0.03 realizes high characteristics of initial permeability equal to or higher than 200, saturation magnetic flux density equal to or higher than 430 mT at 23° C. and equal to or higher than 380 mT at 100° C. and resistivity equal to or higher than 10$^6$ Ωm. In particular, as is clear from FIG. 15, the resistivity is enhanced by addition of CuO. Moreover, the result in FIG. 11 shows that a change in the initial permeability against stress of a sintered ferrite material of the present invention is small.

Example 4

The present example is to demonstrate the reason for limiting the additive amount of $Bi_2O_3$.

Figure 17:
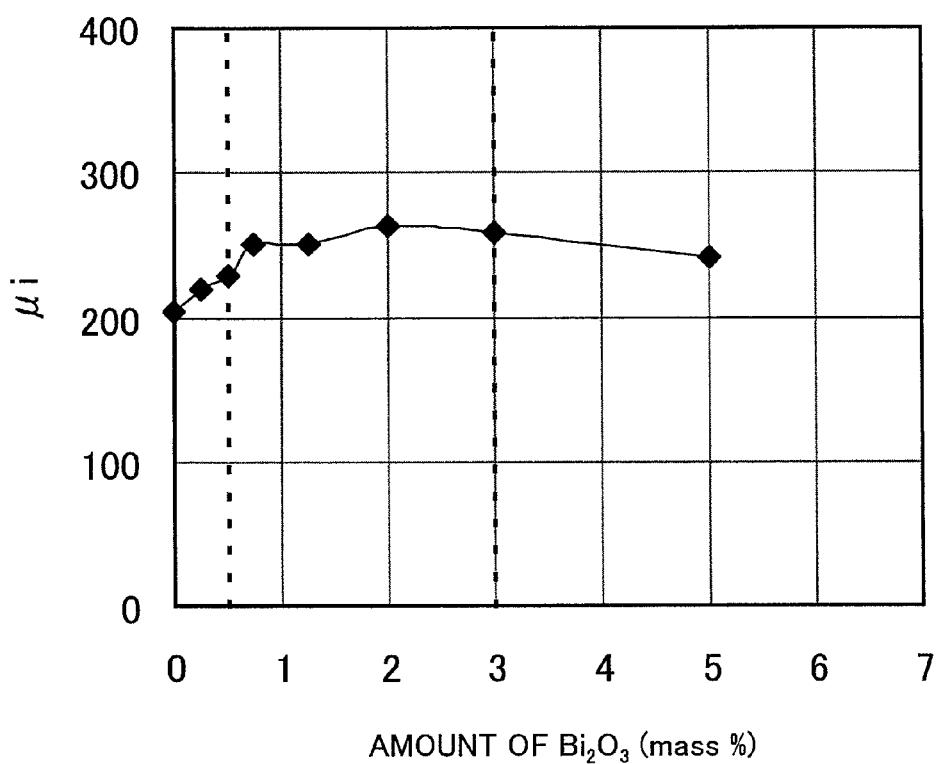
FIG. 17 is a graph for illustrating the relation between the amount of $Bi_2O_3$ and the initial permeability of the sintered ferrite materials.
Figure 19:
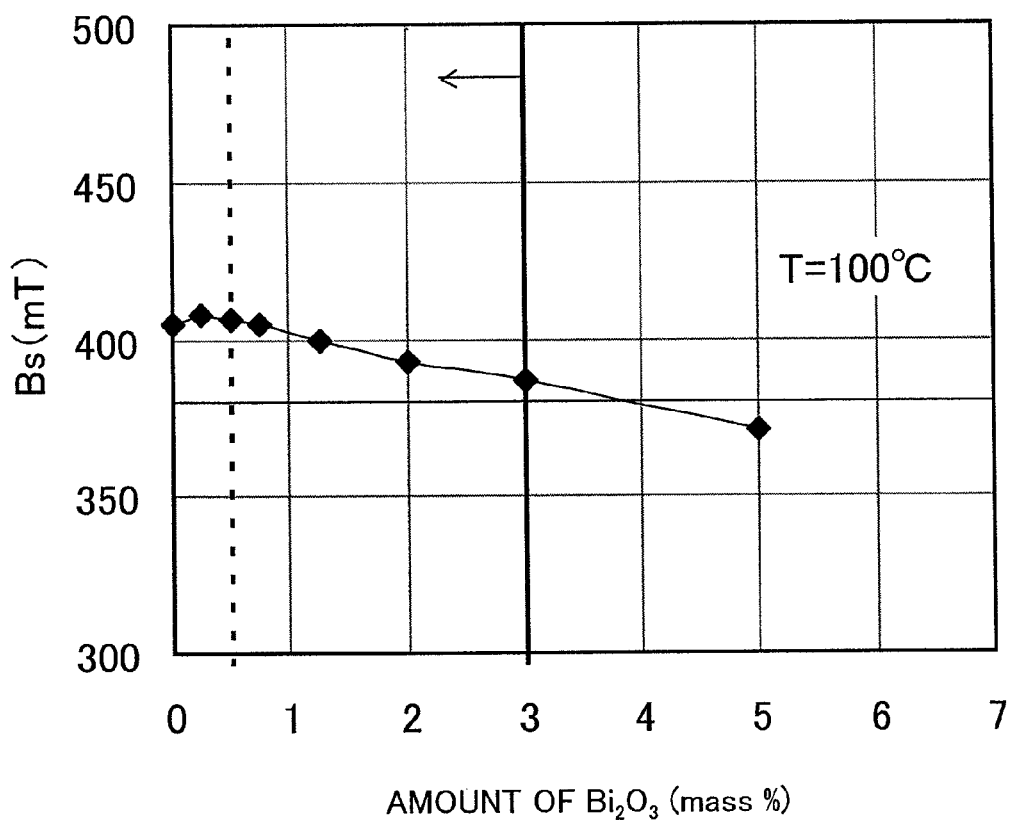
FIG. 19 is a graph for illustrating the relation between the amount of $Bi_2O_3$ and the saturation magnetic flux density at 100° C. of the sintered ferrite materials.

Experiments were conducted in the same way as that of Example 1, except that various final compositions illustrated in FIG. 16 were used. The result is illustrated in FIG. 16. Moreover, graphs showing the result in FIG. 16 are illustrated in FIGS. 17 to 20. The amount of $Bi_2O_3$ is shown in the horizontal axes of the respective graphs, and FIG. 17 is a graph for illustrating a change in the initial permeability, FIG. 18 is a graph for illustrating a change in the saturation magnetic flux density at 23° C., FIG. 19 is a graph for illustrating a change in the saturation magnetic flux density at 100° C. and FIG. 20 is a graph for illustrating a change in the resistivity.

As is clear from FIGS. 16 to 20, the additive amount of $Bi_2O_3$ within the range equal to or higher than 0.5% by mass and equal to or lower than 3% by mass realizes high characteristics of initial permeability equal to or higher than 200, saturation magnetic flux density equal to or higher than 430 mT at 23° C. and equal to or higher than 380 mT at 100° C. and resistivity equal to or higher than $10^6$ μm. Moreover, the result in FIG. 16 shows that a change in the initial permeability against stress of a sintered ferrite material of the present invention is small.

Example 5

The present example is to demonstrate the reason for limiting the average crystal grain size of a sintered ferrite material.

Experimental tests were conducted in the same way as that of Example 1, except that final compositions illustrated in FIG. 21 were used and the pre-sintering temperature was in a range of 800° C. (Sample Number 28), 835° C. (Sample Number 29), 900° C. (Sample Number 30), 1000° C. (Sample Number 31) and 1100° C. (Sample Number 32). Here, a sintering temperature of 930° C. was employed only for Sample Number 28. The result is illustrated in FIG. 21. Moreover, photographs of structure of obtained sintered ferrite materials are illustrated in FIGS. 22 and 23. FIG. 22 is a photograph of structure of Sample Number 28 and FIG. 23 is a photograph of structure of Sample Number 31.

As is clear from FIG. 21, the initial permeability and the saturation magnetic flux density are enhanced without lowering the resistivity when the average crystal grain size is adjusted to be in a range of 7.5 μm or more and 25 μm or less.

Example 6

The present example is to demonstrate an example of the application of a sintered ferrite material to an inductor.

Figure 25:
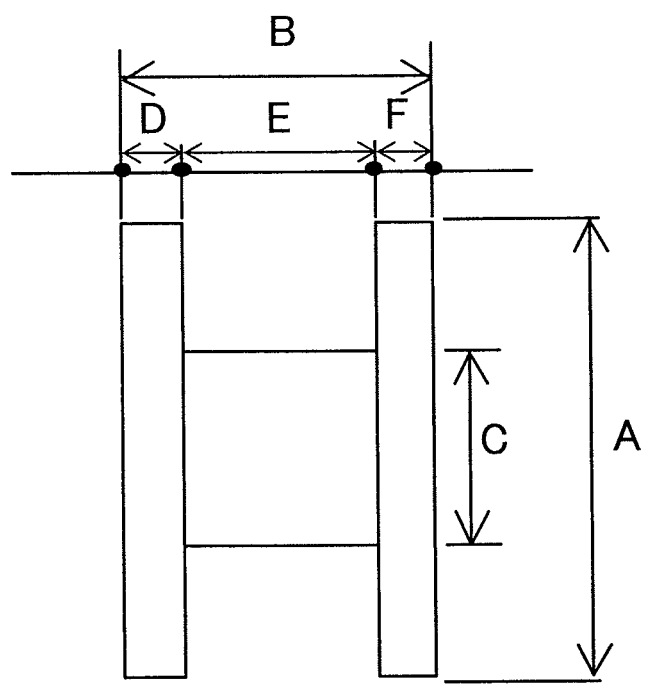
FIG. 25 is a schematic view for illustrating the structure of an inductor.

Drum cores for an inductor illustrated in FIG. 25 were prepared using sintered ferrite materials (Sample Numbers 33 and 34) according to the present invention having saturation magnetic flux density equal to or higher than 380 mT at 100° C. and sintered ferrite materials (Sample Numbers 35 and 36) having saturation magnetic flux density lower than 380 mT at 100° C. illustrated in FIG. 24. The respective dimensions of the cores were A=8.0 mm, B=4.0 mm, C=3.0 mm, D=0.8 mm, E=2.4 mm and F=0.8 mm. 100-turn winding was applied to the cores using covered copper wire of ϕ0.14 mm and the DC superposition characteristic at 100° C. was measured under measurement conditions of 100 kHz and 0.1 V by an LCR meter (produced by HEWLETT PACKARD, having a device name of 4285A). Moreover, in consideration of the DC superposition characteristic, a current value I (A) to become ΔL/L0=−10% was obtained, wherein L0 denotes the inductance at I=0 A, L1 denotes the inductance at the time of DC superposition and ΔL denotes L1-L0. The measurement result is illustrated in FIG. 24.

As is clear from FIG. 24, since a sintered ferrite material according to the present invention has excellent saturation magnetic flux density equal to or higher than 380 mT at 100° C., the current value when L lowers by 10% is as high as equal to or higher than 0.5 A and an excellent DC superposition characteristic is realized. Accordingly, when being used for a wire wound component such as an inductor, a sintered ferrite material according to the present invention can provide an inexpensive inductor having an excellent DC superposition characteristic.

Example 7

The Present Example is to Demonstrate an Example of the application of a sintered ferrite material to an antenna.

Rectangular cores for an antenna of 50 mm×4 mm×4 mm illustrated in FIG. 27 were prepared using sintered ferrite materials (Sample Numbers 37 and 38) according to the present invention having saturation magnetic flux density equal to or higher than 380 mT at 100° C. and sintered ferrite materials (Sample Numbers 39 and 40) having saturation magnetic flux density lower than 380 mT at 100° C. illustrated in FIG. 26, and 70-turn winding was applied to the cores using covered copper wire of ϕ0.29 mm. The DC superposition characteristic at 100° C. of obtained wire wound components was measured under measurement conditions of 100 kHz and 0.1 V by an LCR meter (produced by HEWLETT PACKARD, having a device name of 4285A). Moreover, in consideration of the DC superposition characteristic, a current value I (A), which realizes ΔL/L0=−10%, was obtained, wherein L0 denotes the inductance at I=0 A, L1 denotes the inductance at the time of DC superposition and ΔL denotes L1-L0. The measurement result is illustrated in FIG. 26.

Moreover, the large amplitude characteristic of the wire wound components described above was measured by a primary winding method under measurement conditions of 10 kHz and Iac=1.5 A (0-peak) by measuring instruments (high temperature ovens SY8232 and SY8243 and an external amplifier NF4930 produced by Iwatsu Corporation) to obtain a temperature change L at the time of actual operation. The measurement result is illustrated in FIG. 26.

As is clear from FIG. 26, since a sintered ferrite material according to the present invention has excellent saturation magnetic flux density equal to or higher than 380 mT at 100° C., the current value when L lowers by 10% is as high as equal to or higher than 1.0 A and an excellent DC superposition characteristic is realized. Moreover, the temperature change of L at the time of actual operation is equal to or smaller than 1.0% and is extremely small even at a high current and, therefore, a sintered ferrite material according to the present invention is suitable for a wire wound component such as an antenna.

Example 8

In order to obtain the composition illustrated as Sample Number 4 in FIG. 1, carbonate powder and oxide powder, which are to be the starting materials, were weighed and mixed, and were respectively pre-sintered for 3 hours at pre-sintering temperatures of 800° C. (Sample Number 41), 900° C. (Sample Number 42), 950° C. (Sample number 43), 1000° C. (Sample Number 44), 1100° C. (Sample Number 45) and 1200° C. (Sample number 46) in the atmosphere to obtain pre-sintered powder (first pre-sintered powder). $Bi_2O_3$ was further added in the proportion of 0.75% by mass to 100% by mass of the obtained pre-sintered powder (first pre-sintered powder) to obtain pre-sintered powder (second pre-sintered powder). Said pre-sintered powder (second pre-sintered powder) was pulverized in a ball moll by wet pulverizing to obtain a size of from 1.1 μm to 1.3 μm (measured by an air permeability method) and was then dried.

Polyvinyl alcohol was added in the proportion of 1% by mass to the obtained powder and was granulated to obtain granulated powder. The granulated powder was formed under a forming pressure of 150 MPa and an obtained compact was sintered for 3 hours at 1100° C. in the atmosphere to obtain a sintered ferrite material.

Figure 29:
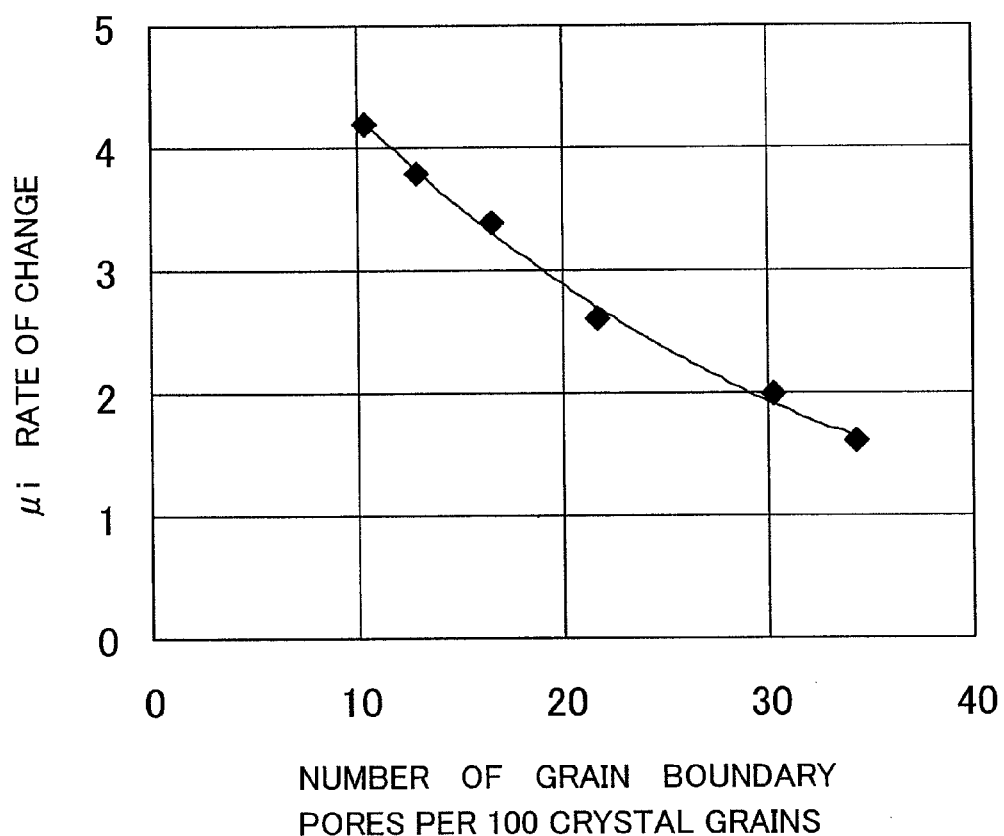
FIG. 29 is a graph for illustrating the relation between the number of grain boundary pores per 100 crystal grains and the rate of change of the initial permeability of the sintered ferrite materials.

The rate of change of the initial permeability under a pressure of 30 MPa of an obtained sintered ferrite material was obtained. The same measuring method as that of Example 1 was used. The result is shown in FIG. 28. Moreover, a graph showing the result in FIG. 28 is illustrated in FIG. 29. It is to be noted that the number of grain boundary pores per 100 crystal grains in FIG. 28 is the number of pores existing at the grain boundary of an area where 100 crystals exist, counted in a cross-sectional photograph of structure of a sintered ferrite material.

As is clear from FIGS. 28 and 29, the number of grain boundary pores increases with reduction of the rate of change of the initial permeability as the pre-sintering temperature becomes higher. Moreover, all of the rates of change of the initial permeability fall within ±5% when the pre-sintering temperature is within the range of 800° C.-1200° C. and, in particular, the number of grain boundary pores per 100 crystal grains becomes equal to or larger than 20 and the rate of change of the initial permeability becomes extremely small, specifically within ±3%, when the pre-sintering temperature is in a range of 1000° C.-1200° C.

Figure 30:
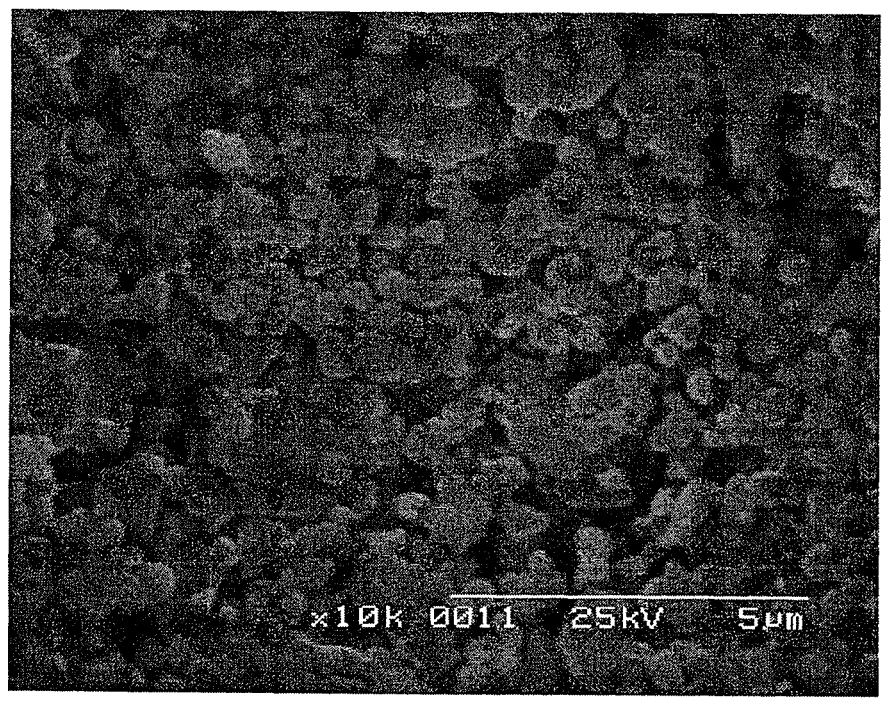
FIG. 30 is a view of an SEM photograph of pulverized powder according to the present invention.
Figure 34:
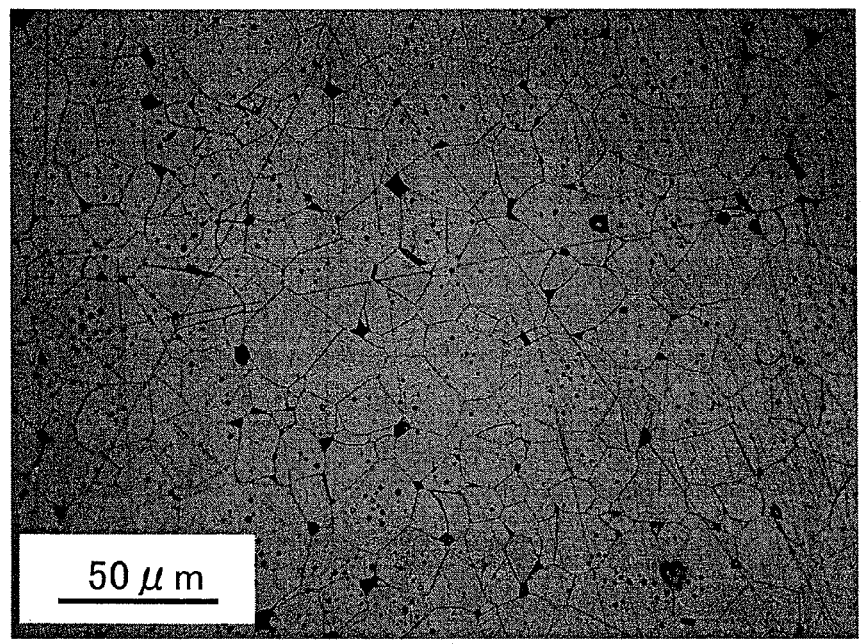
FIG. 34 is a view of a photograph of structure of a sintered ferrite material of the present invention.
Figure 35:
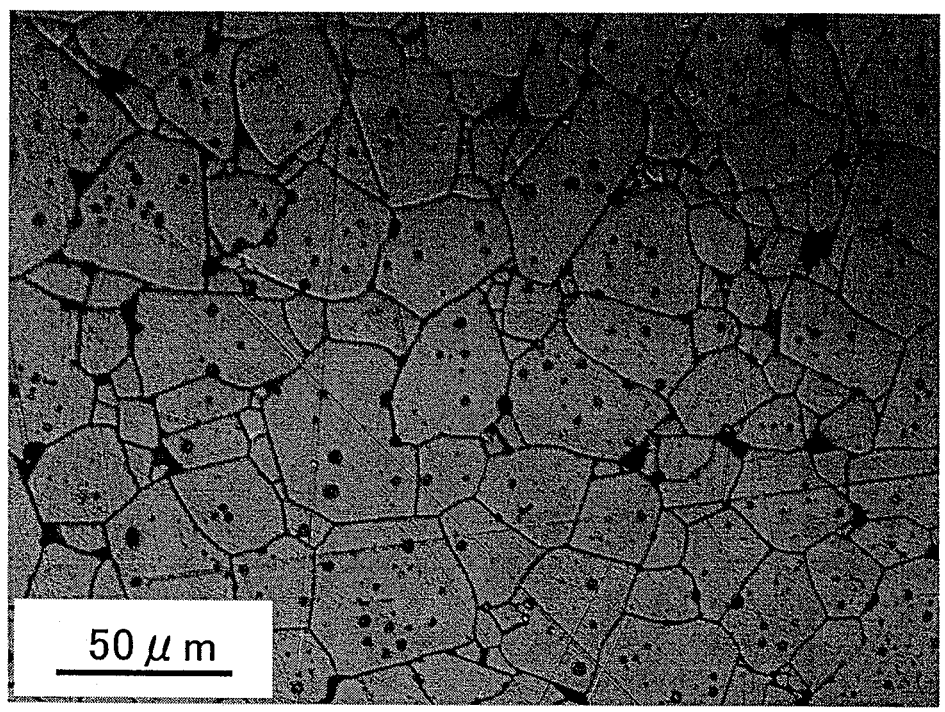
FIG. 35 is a view of a photograph of structure of a sintered ferrite material of the present invention.

FIGS. 30 to 32 are SEM photographs of pulverized powder, and FIGS. 33 to 35 are photographs of structure of sintered ferrite materials obtained after sintering. FIGS. 30 and 33 illustrate the case of Sample Number 41 (pre-sintering temperature of 800° C.), FIGS. 31 and 34 illustrate the case of Sample Number 44 (pre-sintering temperature of 1000° C.) and FIGS. 32 and 35 illustrate the case of Sample Number 46 (pre-sintering temperature of 1200° C.).

FIGS. 30 to 32 show that the respective pulverized powders have different grain size distribution though the respective pulverized powders have almost the same average grain size (1.1 μm-1.3 μm). It can be estimated from FIG. 30 (pre-sintering temperature of 800° C.) that the grain sizes of powders are relatively not much different and the grain size distribution is sharp, while it can be estimated from FIG. 31 (pre-sintering temperature of 1000° C.) and FIG. 32 (pre-sintering temperature of 1200° C.) that a number of relatively large powders and a number of relatively small powders are included and the grain size distribution is not sharp.

Because pre-sintering on a pre-sintering step is applied at a relatively high temperature of 1000° C.-1200° C., powders, which have finished ferritization reaction, form a neck, and binding of powders proceeds as described above, and therefore pulverizing in a pulverizing step becomes difficult. By forming and sintering such pulverized powder, which includes a number of relatively large powders and a number of relatively small powders and has grain size distribution that is not sharp, the number of grain boundary pores per 100 crystal grains becomes equal to or larger than 20 as shown in FIG. 34 (pre-sintering temperature of 1000° C.) or FIG. 35 (pre-sintering temperature of 1200° C.) and a sintered ferrite material having a rate of change of initial permeability, which is extremely small, particularly within ±3%, can be obtained. It is to be noted that the average crystal grain size in FIG. 33 (pre-sintering temperature of 800° C.) is 11.5 μm and is also within a preferable range of an average crystal grain size according to the present invention, and the rate of change of the initial permeability is within ±5%.

Sintered ferrite according to the present invention is ideal for a core material of a wire wound component such as an inductor, an antenna or a transformer of various types such as a direct winding type, which does not require a bobbin that needs to have high resistivity, a gap type, which is to be used in a DC biasing magnetic field that requires high initial permeability and high saturation magnetic flux density and a resin mold type, which requires high resistance to stress.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A sintered ferrite material, which is obtained by adding $Bi_2O_3$ in a range from 0.5% by mass to 1.25% by mass against 100% by mass of a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 < z \leq 0.03$, in which an average crystal grain size is in a range from 7.5 μm to 25 μm, and which satisfies initial permeability equal to or higher than 200, saturation magnetic flux density equal to or higher than 440 mT at 23° C. and equal to or higher than 380 mT at 100° C., and resistivity equal to or higher than $10^6$ Ωm.

2. The sintered ferrite material according to claim 1, wherein a rate of change of initial permeability under a pressure of 30 MPa is within ±5%.

3. The sintered ferrite material according to claim 1, wherein a number of grain boundary pores per 100 crystal grains is equal to or larger than 20.

4. The sintered ferrite material according to claim 3, wherein a rate of change of initial permeability under a pressure of 30 MPa is within ±3%.

5. A wire wound component comprising a core and a wire which is wound on said core, wherein said core comprises a sintered ferrite material according to claim 2.

6. A wire wound component comprising a core and a wire which is wound on said core, wherein said core comprises a sintered ferrite material according to claim 3.

7. A wire wound component comprising a core and a wire which is wound on said core, wherein said core comprises a sintered ferrite material according to claim 4.

8. A producing method of a sintered ferrite material, comprising:
   a step of preparing raw powder to obtain a material having a composition formula of $(1-x-y-z)(Li_{0.5}Fe_{0.5})O \cdot xZnO \cdot yFe_2O_3 \cdot zCuO$ wherein x, y and z satisfy $0.14 \leq x \leq 0.19$, $0.48 \leq y < 0.5$ and $0 < z \leq 0.03$;
   a step of pre-sintering the raw powder to obtain first pre-sintered powder;

a step of adding $Bi_2O_3$ in a range from 0.5% by mass to 1.25% by mass against 100% by mass of the first pre-sintered powder to obtain second pre-sintered powder;

a step of pulverizing the second pre-sintered powder to obtain pulverized powder;

a step of forming the pulverized powder to obtain a compact; and a step of sintering the compact to obtain a sintered ferrite material in which an average crystal grain size is in a range from 7.5 μm to 25 μm.

9. A producing method of a sintered ferrite material, comprising:

a step of preparing raw powder obtained by adding $Bi_2O_3$ to a starting (precursor) material used to obtain a ferrite composition formula of $(1-x-y-z)(Li_{0.5}Fe_{0.5})O \cdot xZnO \cdot yFe_2O_3 \cdot zCuO$, wherein x, y and z satisfy $0.14 \leq x \leq 0.19$, $0.48 \leq y < 0.5$ and $0 < z \leq 0.03$, wherein said $Bi_2O_3$ is added in a range from 0.5% by mass to 1.25% by mass against 100% by mass of said ferrite material;

a step of pre-sintering the raw powder to obtain pre-sintered powder;

a step of pulverizing the pre-sintered powder to obtain pulverized powder;

a step of forming the pulverized powder to obtain a compact; and a step of sintering the compact to obtain a sintered ferrite material in which an average crystal grain size is in a range from 7.5 μm to 25 μm.

10. The producing method of a sintered ferrite material according to claim 8, wherein a pre-sintering temperature for pre-sintering the raw powder is in a range from 800° C. to 1200° C.

11. The producing method of a sintered ferrite material according to claim 9, wherein a pre-sintering temperature for pre-sintering the raw powder is in a range from 800° C. to 1200° C.

12. The producing method of a sintered ferrite material according to claim 10, wherein the pre-sintering temperature is in a range from 1000° C. to 1200° C. and the sintered ferrite material having a rate of change of initial permeability within ±3% under a pressure of 30 MPa is obtained.

13. The producing method of a sintered ferrite material according to claim 11, wherein the pre-sintering temperature is in a range from 1000° C. to 1200° C. and the sintered ferrite material having a rate of change of initial permeability within ±3% under a pressure of 30 MPa is obtained.

* * * * *